United States Patent [19]

Thomas

[11] 4,348,912

[45] Sep. 14, 1982

[54] VARIABLE AMPLITUDE VIBRATOR APPARATUS

[76] Inventor: Hubert E. Thomas, 300 Prospectors Rd., #25, Diamond Bar, Calif. 91765

[21] Appl. No.: 153,203

[22] Filed: May 27, 1980

Related U.S. Application Data

[63] Continuation-in-part of Ser. No. 68,343, Aug. 21, 1979.

[51] Int. Cl.³ .......... F16H 33/00

[52] U.S. Cl. .......... 74/61; 74/573 R

[58] Field of Search .......... 74/61, 87, 573 R; 173/49; 198/770; 209/366.5, 367; 366/123, 128; 404/117

[56] References Cited

U.S. PATENT DOCUMENTS

| | | | |
|---|---|---|---|
| 948,047 | 2/1910 | Fraser | 209/366 |
| 952,565 | 3/1910 | Fraser | 74/87 |
| 1,128,729 | 2/1915 | Shank | 209/366.5 |
| 1,188,903 | 6/1916 | Cornwall | 209/366.5 |
| 1,207,847 | 12/1916 | Brantingham | 74/87 |
| 2,053,895 | 9/1936 | Burmeister | 209/326 |
| 2,063,509 | 12/1936 | Lacy | 209/367 |
| 2,286,770 | 6/1942 | Symons | 209/367 |
| 2,687,718 | 8/1954 | Britton et al. | 74/87 |
| 2,964,186 | 12/1960 | Ferrara | 209/366.5 |
| 2,989,869 | 6/1961 | Hanggi | 74/61 |
| 3,342,075 | 9/1967 | Lowe | 74/61 |
| 3,532,082 | 10/1970 | Clouse et al. | 123/140 |
| 3,600,956 | 8/1971 | Boguth | 209/366.5 |
| 3,606,796 | 9/1971 | Pappers | 404/117 |
| 3,616,730 | 11/1971 | Boone et al. | 404/117 |
| 3,822,604 | 7/1974 | Grimmer | 209/366.5 |
| 4,033,193 | 7/1977 | Brander | 74/61 |

FOREIGN PATENT DOCUMENTS

| | | | |
|---|---|---|---|
| 187489 | 1/1956 | Austria | 209/366.5 |
| 385061 | 4/1908 | France | 128/36 |

*Primary Examiner*—Lawrence J. Staab

*Attorney, Agent, or Firm*—Richards, Harris & Medlock

[57] ABSTRACT

A vibratory apparatus comprises a shaft mounted for rotation about an axis and having weight structure mounted thereon to effect vibration in response to shaft rotation. The shaft may be initially balanced or unbalanced. According to one series of embodiments, a preloaded spring means maintains a primary weight structure in the relatively reduced eccentric position until a first predetermined magnitude of rotational shaft velocity is achieved. The primary weight structure thereafter moves outwardly against the force of the spring means with the spring means also moving to an eccentric position. At a higher, second predetermined magnitude the eccentricity of the primary weight structure and spring means is maximum. Until a higher, third predetermined magnitude of rotational shaft velocity, a secondary movable weight structure is retained in the relatively reduced eccentricity position by a preloaded spring means. The eccentricity of the secondary movable weight structure and spring means is increased until the shaft is substantially counterbalanced at a higher, fourth predetermined magnitude. By selecting the spring means biasing the secondary movable weight structure in the relatively reduced position, a predetermined range of rotational velocities may be selected between the third and fourth predetermined magnitude so that the amplitude of the apparatus may be selectively varied within the predetermined range. The center of mass of the respective spring means may be positioned substantially on the axis of rotation of the apparatus when the respective weight members are in the reduced eccentricity position to reduce the rotational inertia of the apparatus.

12 Claims, 37 Drawing Figures

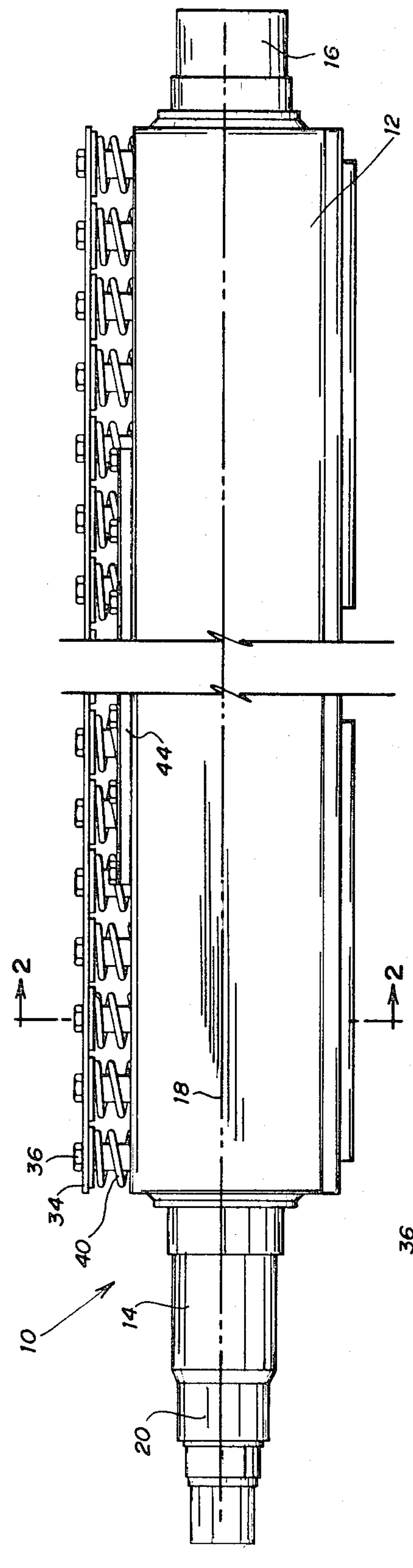
FIG. 1
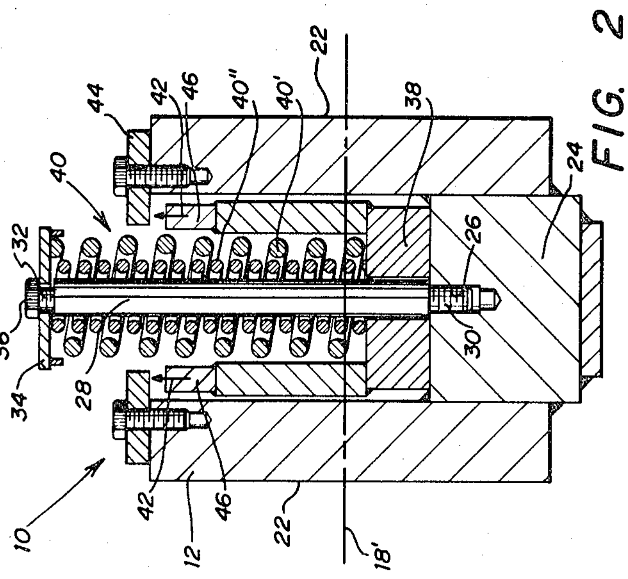
FIG. 2
| RPM | TOTAL DEFLECTION | AMPLITUDE | FORCE (lbs) |
|---|---|---|---|
| 1600 | .105" | .053" | 38,000 |
| 1800 | .090" | .045" | 36,000 |
| 1900 | .080" | .040" | 33,800 |
| 2000 | .075" | .038" | 31,800 |
| 2100 | .070" | .035" | 29,750 |
| 2200 | .060" | .030" | 27,800 |
| 2300 | .045" | .023" | 25,800 |
| 2400 | .040" | .020" | 23,900 |
| 2500 | .030" | .015" | 22,000 |
FIG. 3

VARIABLE AMPLITUDE VIBRATOR APPARATUS

CROSS-REFERENCE TO RELATED APPLICATIONS

This application is a continuation-in-part of co-pending application Ser. No. 06/068,343, filed Aug. 21, 1979.

TECHNICAL FIELD

This invention relates to variable amplitude vibratory apparatus, and more particularly to rotational type vibration generating mechanism wherein the vibrational amplitude is a function of rotational velocity.

BACKGROUND ART

At the present time, various vibrational devices are in commercial use. These include conveyors, shaker screens, pile drivers, pavement breakers, asphalt finishers, cement spreaders, concrete vibrators, grain crushers, and similar mechanisms. One particular type of vibratory device is a vibratory roller/compactor wherein vibration is utilized in addition to the usual rolling action to effect compaction of the underlying material. In many instances it is considered desirable to vary the vibrational amplitude of such apparatus in order to increase versatility and thereby render the apparatus more useful. For example, in the case of a vibratory roller/compactor it is considered desirable to maintain a large vibrational amplitude when the device is operating at lower vibrational speeds in order to compact coarse materials in deep lifts, and to reduce the vibrational amplitude when the device is operating at higher (rotating) vibrational speeds and working in thin lifts on finely graded material such as asphalt so as not to crush and destroy the material being compacted.

Heretofore changes in vibrational amplitude have typically comprised dual amplitude or multiple amplitude devices. That is, such devices have been capable of vibrating at two or more specific amplitudes, but have not been capable of operating over an infinitely variable range of amplitudes. Thus, a need exists for a variable amplitude vibratory apparatus wherein the vibrational amplitude can be varied over a range, and wherein the vibrational amplitude can be selected to provide the most efficient operation.

Other variable amplitude devices have been developed and are in use in vibratory/roller compactors. However, these devices require elaborate control systems for the transfer of fluids and gases and the restriction of speeds through elaborate electrical controls when the fluid displacement is at a maximum. Thus, the need exists for a variable amplitude vibratory apparatus that does not require special controls or liquid or gas connections to the inside of the drum, and that does not require elaborate electrical controls to limit the vibrational speed.

The present invention comprises a variable amplitude vibratory apparatus which overcomes the foregoing and other disadvantages long since associated with the prior art. In accordance with the broader aspects of the invention, a shaft is mounted for rotation about an axis. The shaft is eccentrically weighted so as to effect vibration upon rotation. Additional weight structure is mounted on the shaft for movement radially outwardly against spring action in response to a centrifugal force caused by rotation of the shaft. At a predetermined rotational velocity the force on the weight overcomes the holding power of the spring. Because of this movement the balance of the shaft is changed, and the vibrational amplitude of the apparatus therefore varies as a function of the rotational velocity of the shaft. The amplitude of the apparatus is simply controlled within predetermined limits by controlling the speed of the shaft.

Various embodiments of the invention are disclosed. Each embodiment can be used in any application where forced vibration performs useful work. In accordance with one embodiment, a single movable weight structure is utilized. The movable weight structure is slidably supported on rods which are secured to the shaft. The rods secure springs which are selected so as to prevent movement of the movable weight structure until the rotational velocity of the shaft reaches a predetermined magnitude. Thereafter the movable weight structure slides outwardly on the rods against the action of the springs, with the positioning of movable weight structure on the rods being dependent on the rotational velocity of the shaft. As the movable weight structure moves outwardly, the vibrational amplitude caused by shaft rotation is progressively diminished.

In accordance with a second embodiment of the invention, dual movable weight structures are utilized. The shaft is initially balanced. This feature allows smoother acceleration of the shaft and is advantageous in a vibratory roller/compactor when the shaft is being slowed to a stop, so as to eliminate a vibrating frequency that would cause resonance in the adjacent and/or supporting structure. The first movable weight structure is counterbalanced, and is mounted for movement outwardly relative to the axis of rotation of the shaft against spring action when the rotational velocity of the shaft reaches a first predetermined magnitude. At this point, the vibrational amplitude of the apparatus is maximized. The second movable weight structure is in turn adapted to begin sliding movement outwardly relative to the axis of rotation of the shaft against spring action when the rotational velocity of the shaft reaches a second, higher magnitude. Outward movement of the second movable weight structure functions to diminish vibrational amplitude as the rotational velocity of the shaft increases. The rotational velocity of the shaft may subsequently be increased further to rebalance the shaft.

A third embodiment of the invention utilizes leaf springs to resist outward movement of a weight in response to shaft rotation. Dual leaf spring/weight structures may be utilized in order to provide an apparatus that is balanced at low rotational velocities, that is substantially unbalanced when the rotational velocity of the shaft reaches a first predetermined magnitude, and that is unbalanced to a lesser degree when the rotational velocity of the shaft reaches a second, higher predetermined magnitude.

A fourth embodiment of the invention utilizes torsional springs to resist outward movement of weights in response to shaft rotation. Two pairs of torsional spring/weight structures are mounted for pivotal movement about axes perpendicular to the axis of rotation of the shaft. The apparatus is balanced at low rotational shaft velocities, up to a first predetermined magnitude, but thereafter becomes progressively unbalanced as the rotational shaft velocity reaches a second, higher predetermined magnitude.

In accordance with a fifth embodiment of the invention, multiple movable weight structures are utilized so that the shaft is initially balanced. This feature allows smoother acceleration of the shaft and is also advantageous in a vibratory roller/compactor as the shaft is brought to a stop without causing resonance in the drum/frame system. The shaft remains balanced up to a first predetermined shaft rotational velocity, at which point the primary movable weight structure(s) commences outward movement relative to the axis of rotation of the shaft against spring action. At a second predetermined rotational shaft velocity, the primary movable weight structure reaches maximum outward displacement, whereby the vibrational amplitude of the apparatus is maximized. Outward movement of the secondary movable weight structure(s) functions to diminish vibrational amplitude as the rotational shaft velocity increases beyond a third predetermined magnitude. Thus, the vibrational amplitude of the apparatus may be changed by increasing or decreasing rotational velocity of the shaft.

A sixth embodiment of the invention incorporates triple movable weight structures and is initially balanced. Dual pivotal weight structures pivot outwardly from the shaft in opposition to elastomeric springs after a first predetermined rotational shaft velocity has been attained. The vibrational amplitude of the apparatus is maximized until the rotational velocity of the shaft reaches a second higher value, when outward movement of the secondary movable weight structure(s) functions to decrease vibrational amplitude as the rotational shaft velocity increases further.

In accordance with a seventh embodiment of the invention, dual movable weight structures are utilized so that the shaft is initially balanced. The first movable weight structure is mounted for movement outwardly relative to the axis of rotation of the shaft against stacks of elastomeric springs until the rotational shaft velocity reaches a first predetermined magnitude, which corresponds to maximum vibrational amplitude of the apparatus. The second movable weight structure in turn begins outward movement relative to the axis of rotation of the shaft against stacks of elastomeric springs when the rotational shaft velocity reaches a second predetermined magnitude. This functions to decrease vibrational amplitude of the apparatus as the rotational shaft velocity increases.

According to an eighth embodiment of the invention, dual movable weight structures are enclosed within a housing on a shaft so as to be initially balanced. Elastomeric springs are utilized to resist outward movement of the weights in response to shaft rotation. The shaft is balanced until rotational shaft velocity reaches a first predetermined value, at which point the first movable weight structure begins outward movement relative to the axis of rotation of the shaft until reaching a maximum displacement corresponding to maximum vibrational amplitude. At a second, higher predetermined shaft rotational velocity, the second movable weight structure begins outward movement which tends to counterbalance the first movable weight, decreasing vibrational amplitude as the rotational shaft velocity increases. After the second movable weight structure reaches maximum displacement, the vibrational amplitude stays constant in spite of further increases in rotational shaft velocity. In each of the foregoing embodiments, other spring systems, including elastomeric springs, coil springs, and disc springs, may be utilized interchangeably to resist weight movement, if desired.

The ninth embodiment of the invention features dual movable weight structures constructed of a resilient material so as to resist deflection thereof. The weight structure is enclosed within a housing mounted on a shaft which is balanced. The dual, combination spring/-weight structures are responsive to rotational shaft velocity to provide an apparatus that is balanced at relatively low rotational velocity, that is substantially unbalanced when the rotational shaft velocity reaches a first predetermined magnitude, and that is unbalanced to a lesser extent when the rotational shaft velocity reaches a second, higher predetermined magnitude.

In the tenth embodiment of the invention, dual movable weight structures are utilized with the shaft being initially balanced. The movable weight structures are slidably supported on rods which are secured to the shaft. The rods secure helical compression springs which are pre-loaded so as to prevent movement of a movable weight structure until the rotational velocity of the shaft reaches a predetermined magnitude. The center of mass of the shaft remains coincident with the axis of rotation of the shaft until a first predetermined shaft rotational velocity is achieved, at which point the primary movable weight structure(s) commences outward movement relative to the axis of rotation of the shaft against the spring action. As the primary movable weight structure(s) move outwardly, the springs acting on the primary movable weight structure(s) are compressed and the center of mass of the springs also move in the outward direction thereby enhancing the eccentricity of the shaft. At a second predetermined rotational shaft velocity, the primary movable weight structure(s) reaches a maximum outward displacement, whereby the vibrational amplitude of the apparatus is maximized. Outward movement of the secondary movable weight structure(s) functions to diminish vibrational amplitude as the rotational shaft velocity increases beyond a third predetermined magnitude. The springs acting on the secondary movable weight structure(s) are compressed as the secondary movable weight structure(s) move outwardly and the center of mass of the springs also move in the outward direction to further diminish the vibrational amplitude of the rotational shaft. Thus, the vibrational amplitude of the apparatus may be changed by increasing or decreasing rotational velocity of the shaft. The springs acting on the secondary movable weight structure(s) are chosen to allow a selective variation of vibrational amplitude in the range of shaft velocity between the third predetermined magnitude and a fourth predetermined magnitude where the secondary movable weight structure(s) reaches maximum outward displacement whereby the shaft is balanced. A condition of balanced rotation may be achieved either at rotational velocity below the first predetermined rotational shaft velocity or above the fourth predetermined magnitude wherein the secondary movable weight structure(s) reaches maximum outward displacement whereby the shaft is again balanced.

According to an eleventh embodiment of the invention, dual movable weight structure(s) are secured by a combined support/spring means on a shaft, with the entire structure being initially balanced. The combined support/spring means are preloaded to prevent movement of a movable weight structure(s) until the rotational velocity of the shaft reaches a predetermined magnitude. At a first predetermined magnitude, the primary movable weight structure(s) commences outward movement relative to the axis of rotation of the shaft against the spring action. As the primary movable weight structure(s) moves outwardly, the combined support/spring means is compressed and the center of mass of the support/spring means also moves outwardly to supplement the eccentricity of the primary movable weight structure(s). At a second predetermined rotational shaft velocity, the primary movable weight structure reaches maximum outward displacement whereby the vibrational amplitude of the apparatus is maximized. Outward movement of the secondary movable weight structure(s) functions to diminish vibrational amplitude as the rotational shaft velocity increases beyond a third predetermined magnitude. The combined support/-spring means supporting the secondary movable weight structure(s) is also compressed and its center of mass moves outwardly to further diminish the vibrational amplitude of the rotational shaft. At a fourth predetermined rotational shaft velocity, the secondary movable weight structure also reaches maximum outward displacement whereby the vibrational apparatus is again balanced. The combined support/spring means supporting the secondary movable weight structure(s) is chosen to permit selective variation of vibrational amplitude in the range of shaft velocity between the third and fourth predetermined magnitudes.

In a twelfth embodiment of the invention, multiple movable weight structure(s) are utilized with elastomeric spring means which pre-load the weight structure(s) so that the shaft has a center of mass coincident with the axis of rotation and is initially balanced up to a first predetermined shaft rotational velocity. At the first predetermined shaft rotational velocity, the primary movable weight structure(s) commences outward movement relative to the axis of rotation of the shaft against the spring action. At a second predetermined rotational shaft velocity, the primary movable weight structure(s) reaches maximum outward displacement, whereby the vibrational amplitude of the apparatus is maximized. Outward movement of the secondary movable weight structure(s) functions to diminish vibrational amplitude as rotational shaft velocity increases beyond a third predetermined magnitude. At a fourth predetermined rotational magnitude, the secondary movable weight structure(s) reaches maximum outward displacement, whereby the vibrational apparatus is again balanced. The elastomeric spring means resisting outward movement of the secondary movable weight structure(s) is chosen to permit selective variation of vibratory amplitude in a range of shaft velocity between the third and fourth predetermined magnitudes.

DESCRIPTION OF THE DRAWINGS

A more complete understanding of the invention may be had by reference to the following Detailed Description when taken in conjunction with the accompanying Drawings, wherein:

FIG. 1 is a side view of a variable amplitude vibratory apparatus incorporating a first embodiment of the invention in which certain parts have been broken away to more clearly illustrate certain features of the invention;

FIG. 2 is a sectional view taken generally along the line 2—2 in FIG. 1 in the direction of the arrows;

FIG. 3 is a table showing typical operating characteristics of the embodiment of the invention in FIG. 1;

DETAILED DESCRIPTION

Figure 4:
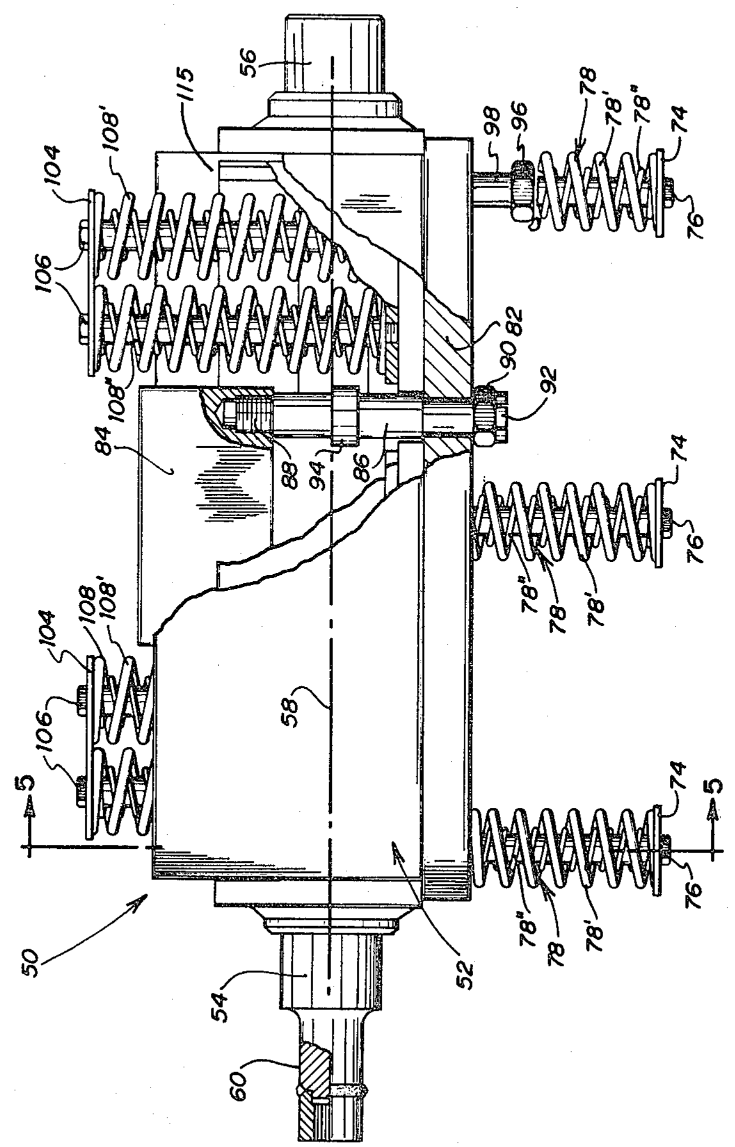
FIG. 4 is a side view of a variable amplitude vibratory apparatus incorporating a second embodiment of the invention in which certain parts have been broken away to more clearly illustrate certain features of the invention.

Referring now to the Drawings, and particularly to FIG. 1 thereof, there is shown a variable amplitude vibratory apparatus 10 incorporating a first embodiment of the invention. The apparatus 10 comprises a shaft 12 which is adapted for use in a vibratory mechanism, for example, a vibratory roller/compactor. The shaft 12 has a pair of opposed bearing portions 14 and 16 which define an axis of rotation 18. The vibratory apparatus 10 is particularly useful in an application where relatively widely spaced supporting means for bearing portions 14 and 16 require a longer shaft 12. Rotation of the shaft 12 about the axis 18 is effected by means of structure 20 at the end thereof adjacent the bearing portion 14. The structure 20 may comprise an internal spline, an external spline, suitable gearing, or other conventional structure.

Referring to FIG. 2 the plane 18′ shown therein is coincident with the axis of rotation 18 of the shaft 12. The shaft 12 comprises a spaced pair of side plates 22. A member 24 is secured to the plates 22 by welding for cooperation therewith to define the frame of the shaft 12. The positioning of the member 24 is substantially offset from the axis of rotation 18 of the shaft 12, and thus defines an eccentrically positioned weight or mass. Thus, upon rotation of the shaft 12 the eccentric positioning of the member 24 causes vibration of the structure incorporating the vibratory apparatus 10.

The member 24 has a plurality of drilled and tapped holes 26 formed therein. A plurality of rods 28 are each provided with a reduced and threaded end portion 30 whereby the rods are threadedly secured to the member 24. Each of the rods 28 extends through the axis of rotation 18 of the shaft 12 and radially outwardly with respect thereto to a reduced and threaded end portion 32. A spring retainer 34 is mounted on the rods 28 and is secured thereon by threaded engagement of a nut 36 with the reduced and threaded portion 32 of each rod 28.

An elongate, generally U-shaped movable weight member 38 is slidably supported on the rod 28 of the shaft 12. The movable weight member 38 is normally retained in the position illustrated in FIG. 2 by means of a plurality of springs 40. The springs 40 are arranged in pairs, with each pair being concentric with one of the rods 28. Each pair of springs comprises a relatively large diameter spring 40′ and a relatively small diameter spring 40″. The springs 40 extend between the spring retainer 34 and the movable weight member 38. It will be understood that both the spring rate and the preloading of the springs 40 depends upon the desired operating characteristics of the variable amplitude vibratory mechanism 10.

The multiplicity of rods 28 and springs 40 constitutes a significant feature of this embodiment whereby the loading is distributed over a longer shaft 12 to eliminate undesirable bending and fatigue characteristics. This more uniform loading also minimizes misalignment of supporting structure for the bearing portions 14 and 16. Moreover, utilization of a plurality of springs helps maintain low individual spring stress and effectively averages variances in individual spring specifications.

In the operation of the variable amplitude vibratory apparatus 10, the movable weight member 38 is initially retained in the position illustrated in FIG. 2. As the rotational velocity of the shaft 12 is increased, the resistance of the springs 40 is eventually overcome, whereupon the movable weight member 38 beings to move outwardly on the rods 28 in the direction of the arrows 42. As the rotational velocity of the shaft 12 continues to increase, the movable weight member 38 continues to move outwardly on the rods 28 until further movement thereof is prevented by stops 44 which are secured to the upper ends of the plates 22. Additional weight members 46 may be utilized to balance the shaft 12 in the dynamic condition, if desired.

As will be readily understood by those skilled in the art, the operating characteristics of a rotational type vibratory apparatus are typically designated by means of the wr factor, the units of which are express in pound-inches. The unbalance of the rotating shaft in a vibrating apparatus causes movement of the entire vibrating apparatus thereby performing useful work. The shaft is forced to rotate by various means causing a centrifugal force to be developed. Thus:

$$F=0.000341\ wrn^2$$

derived from the formula $F=(wv^2/gr)$ where n=number of revolutions per minute, w=weight of the revolving body in pounds, and r=perpendicular distance from the axis of rotation to the center of mass, or for practical use, to the center of gravity of the revolving body, in inches.

The "wr" factor affects the amplitude of the apparatus as well as the force. The amplitude can be calculated for a single shaft system using the following formula.

$$F=0.000341\ Wan^2$$

where

W=Total weight of all vibrating parts including w (the weight of the unbalanced shaft assembly), and a=radius of gyration of the apparatus or amplitude thus $$F=0.000341\ Wan^2=0.000341\ wrn^2$$

therefore

Wa=wr and a=(wr/W)

w and W are constants for any given apparatus but the weight held in place by springs the value for "r" can be changed and "a" therefore changes in direct proportion. It will thus be understood that the primary advantage derived from the use of the first embodiment of the invention involves the fact that by properly selecting both the spring rates and the preloading of the springs, the system may be designed to generate a wr factor which varies with the rotational velocity of the shaft.

By way of example, a variable amplitude vibratory shaft constructed as shown in FIGS. 1 and 2 was designed to have a constant unbalance from zero RPM through 1800 RPM, and to thereafter have a declining wr factor from 1800 to 2500 RPM. That is, the springs 40 were designed to retain the weight member 38 in the position shown in FIG. 2 until the rotational velocity of the shaft 12 reached 1800 RPM. Upon further increase in the rotational velocity of the shaft 12, the movable weight member 38 moved outwardly on the rods 28 and finally engaged the stops 44 when the rotational velocity of the shaft 12 reached 2500 RPM. This may be summarized as follows:

| | Rotational Velocity of Shaft 12 | wr Factor |
|---|---|---|
| (1) | Static through 1800 RPM | 378 |
| (2) | at 2500 RPM | 125 |

it being understood that the wr factor is infinitely variable between the limits of 378 at rotational velocities up to 1800 RPM and 125 at rotational velocities of 2500 RPM and above.

The foregoing variable amplitude vibratory apparatus constructed in accordance with FIGS. 1 and 2 was mounted in a vibratory roller/compactor. The operational characteristics of the vibratory roller/compactor incorporating the present invention are summarized in the table comprising FIG. 3. Referring to FIG. 3, it will be seen that both the vibrational amplitude of the roller of the vibratory roller/compactor and the force applied by the roller of the vibratory roller/compactor decreased uniformly as the rotational velocity of the shaft of the variable amplitude vibratory apparatus of the vibratory roller/compactor was increased from 1800 RPM and 2500 RPM. The figures shown are from an actual test wherein a record of the total deflection or "drum bounce" was made and measured. The amplitude, which is ½ the total deflection, compares reasonably well with the amplitude as calculated by the formula a=wr/W where the total weight W=7500 pounds and wr varied from 378 to 125 pound-inches.

The forces in FIG. 3 were calculated from the formula set out above using the known calculated values for wr, 378 at 1600 RPM and 125 at 2500 RPM. The force figures between these RPM were interpolated using a straight line method.

Referring now to FIG. 4, there is shown a variable amplitude vibratory apparatus 50 comprising a second embodiment of the invention. The apparatus 50 comprises a shaft 52 having opposed bearing portions 54 and 56. The bearing portions 54 and 56 support the shaft 52 for rotation about an axis 58. Rotation of the shaft 52 is effected by means of structure 60 extending from the end thereof adjacent the bearing portion 54. The structure 60 may comprise an internal spline as shown, an external spline, suitable gearing, or other conventional structure.

Figure 5:
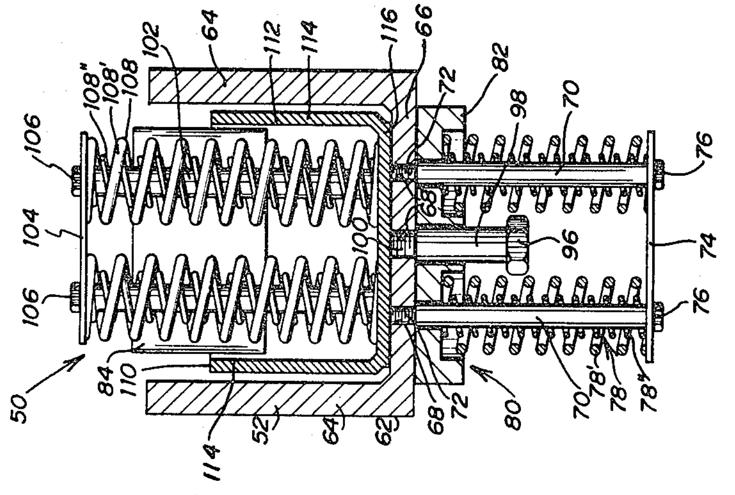
FIG. 5 is a sectional view taken generally along the lines 5—5 in FIG. 4 in the direction of the arrows.

Referring to FIG. 5, the shaft 52 comprises a generally U-shaped frame member 62. The frame member 62 comprises a pair of side plates 64 and a base member 66. The base member 66 has a plurality of drilled and tapped holes 68 formed therein (not all of which are shown).

A plurality of rods 70 are each provided with a reduced and threaded end portion 72. By this means the rods 70 are each threadedly secured to the base 66 of the U-shaped frame 62. The rods 70 are symmetrically disposed about the axis of rotation 58 of the shaft 52, and each pair of rods 70 extends radially outwardly therefrom. The ends of the rods 70 remote from the reduced and threaded portions 72 are similarly reduced and threaded, and spring retainers 74 are secured thereon by means of nuts 76.

A plurality of springs 78 are arranged in pairs, with each pair being concentric with one of the rods 70. Each pair of springs 78 comprises a relatively large diameter spring 78' and a relatively small diameter spring 78''. The springs 78 are each mounted between one of the spring retainers 74 and a first movable weight assembly 80. The first movable weight assembly 80 comprises a first member 82 having the rods 70 extending therethrough. The first member 82 is mounted for sliding movement relative to the rods 70. The first movable weight assembly 80 further comprises a second member 84 which is secured to the first member 82 for movement therewith.

Referring momentarily to FIG. 4, the first and second members 82 and 84 comprising the first movable weight assembly 80 are interconnected by means of a plurality of rods 86. Both ends of each rod 86 are threaded, and one end of each rod 86 is threadedly engaged with the second weight member 84 at 88. The opposite end of each rod 86 receives a nut 90 and a jam nut 92, whereby the members 82 and 84 are secured one to the other.

The first movable weight assembly 80 is mounted for sliding movement along the rods 70 against the action of the springs 78. Such movement of the first movable weight assembly 80 is limited by a plurality of stops 94 mounted on the rods 86 and adapted for engagement with the base member 66 of the U-shaped frame 62. Referring again to FIG. 5, movement of the first movable weight assembly 80 is further limited by a plurality of stops 96 mounted at the distal ends of the rods 98 having reduced and threaded end portions 100, whereby the rods 98 are threadedly secured to the base member 66 of the U-shaped frame 62.

A plurality of rods 102 are each similar to the rods 70. Each rod 102 has a reduced and threaded end (not shown) which threadedly engages one of the apertures 68 formed in the base member 66 of the frame 62. The opposite ends of the rods 102 are reduced and threaded, and spring retainers 104 are received thereon. The spring retainers 104 are secured by nuts 106 which threadedly engage the reduced and threaded distal ends of the rods 102.

A plurality of springs 108 are arranged in pairs, with each pair being concentric with one of the rods 102. Each pair of springs 108 comprises a relatively large diameter spring 108' and a relatively small diameter spring 108". Springs 108 are each mounted between one of the spring retainers 104 and a second movable weight assembly 110.

The second movable weight assembly 110 comprises an open box type member 112 including a pair of side plates 114, a pair of end plates 115 and a base plate 116. The base 116 of the second movable weight assembly 110 is normally retained in engagement with the base 66 of the U-shaped frame 62 by means of the springs 108. The side plates 114 of the second movable weight assembly 110 extend between the side plates 64 of the frame 62 and the outside surfaces of the second member 84 of the first movable weight assembly 80.

The operation of the variable amplitude vibratory apparatus 50 is as follows. The shaft 52 is initially balanced, and the wr factor of the apparatus is therefore initially substantially zero. This is highly advantageous in that the amplitude remains substantially zero relative to and in direct proportion to the wr factor. In a vibratory roller/compactor when the shaft speed is slowed and passes through the range of speeds between about 1000–800 RPM, resonant frequency in the frame-drum system develops causing undesirable bouncing. The balanced shaft of the present invention eliminates this problem. This is extremely valuable in compacting asphalt surfaces where a more smooth end result is a necessity.

When the rotational velocity of the shaft 52 reaches a first pedetermined magnitude, the first movable weight assembly 80 moves outwardly along the rods 70 until the stops 94 and 96 are engaged. At this point the wr factor of the variable amplitude vibrational apparatus 50 is maximized. This operational condition of the apparatus 50 continues until the rotational velocity of the shaft 52 reaches a second predetermined magnitude. As the rotational velocity of the shaft 52 increases beyond the second predetermined magnitude the second movable weight assembly 110 moves outwardly on the rods 102 thereby decreasing the wr factor of the variable amplitude vibratory apparatus 50. Further outward movement of the second movable weight assembly 110 is finally limited by engagement thereof with the second member 84 of the first movable weight assembly 80, whereupon the wr factor of the variable amplitude vibratory apparatus 50 has been substantially reduced.

By way of example, a variable amplitude vibratory apparatus of the type illustrated in FIGS. 4 and 5 was designed to have a wr factor of substantially zero from zero RPM through approximately 1200 RPM. As the rotational speed of the shaft increased beyond 1200 RPM the first movable weight assembly of the device moved outwardly, and thereupon established a maximum wr factor of 135. This wr factor was substantially constant until the rotational velocity of the shaft reached approximately 2000 RPM. At that point the second movable weight assembly began to move outwardly whereby the wr factor of the apparatus was gradually reduced. At approximately 3000 RPM the second movable weight assembly reached the outer limit of its movement, whereupon the wr factor of the apparatus was reduced to approximately 45.

Figure 6:
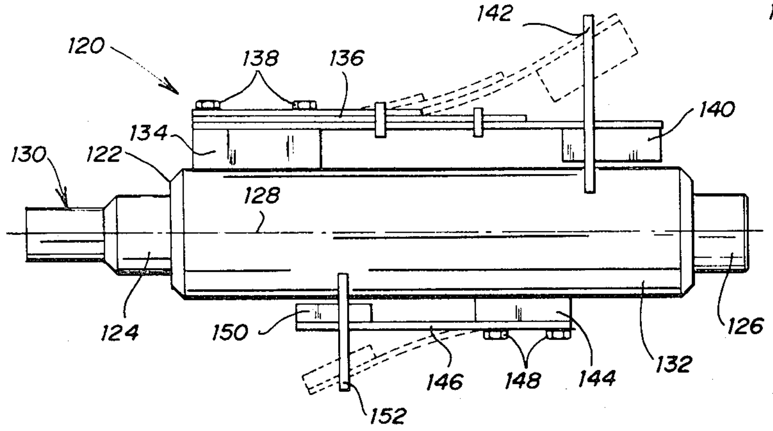
FIG. 6 is a side view of a variable amplitude vibratory apparatus incorporating a third embodiment of the invention.
Figure 7:
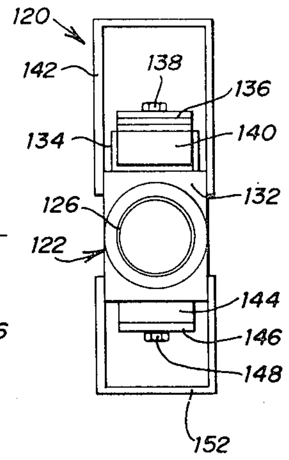
FIG. 7 is an end view of the embodiment of the invention illustrated in FIG. 6.

Referring to FIGS. 6 and 7, there is shown a variable amplitude vibratory apparatus 120 incorporating a third embodiment of the invention. The apparatus 120 comprises a shaft 122 which is adapted for use in a vibratory mechanism, for example a vibratory roller/compactor. The shaft 122 has a pair of opposed bearing portions 124 and 126 which define an axis of rotation 128. Rotation of the shaft 122 about the axis 128 is efffected by means of structure 130 at the end thereof adjacent the bearing portion 124. The structure 130 may comprise an internal spline as shown, an external spline, suitable gearings, or other conventional structure.

The shaft 122 comprises a central portion 132 which is symmetrical about the axis 128. A block 134 is secured on the portion 132, and a leaf spring 136 is mounted on the block 134. The leaf spring 136 is retained by means of fasteners 138. A weight 140 is mounted at the distal end of the leaf spring 136, and is retained thereon by suitable means as conventional fasteners or welding.

The leaf sring 136 retains the weight 140 in the position illustrated in full lines in FIG. 6 until the rotational velocity of the shaft 122 exceeds a first predetermined magnitude. As the rotational velocity of the shaft 122 is further increased, the weight 140 moves outwardly against the action of the spring 136. A yoke 142 is provided for limiting the outward movement of the weight 140 as the rotational velocity of the shaft 122 further increases.

A block 144 is mounted on the shaft 122. A leaf spring 146 is secured to the block 144 by fasteners 148, and in turn supports a weight 150. The leaf spring 146 retains the weight 150 in the position illustrated in full lines in FIG. 6 until the rotational velocity of the shaft 122 exceeds a second, higher predetermined magnitude. Thereafter, as the rotational velocity of the shaft 122 is further increased the weight 150 moves outwardly against the action of the leaf spring 146. A yoke 152 is provided for limiting outward movement of the weight 150 as the rotational velocity of the shaft 122 is further increased.

As is most clearly shown in FIG. 7, the weights 140 and 150 are both supported for outward movement in a plane extending through the axis 128. It will thus be understood that the shaft 122 is initially balanced, and that the wr factor of the shaft is therefore substantially zero until the first predetermined rotational velocity of the shaft 122 is reached. The weight 140 thereupon moves outwardly to the position shown in dashed lines in FIG. 6, whereby the wr factor of the shaft 122 is maximized. As the rotational velocity of the shaft 122 is increased through the second predetermined magnitude, the weight 150 moves outwardly to the position shown in dashed lines in FIG. 6. The weight 150 tends to counter balance the weight 140, whereby the wr factor of the shaft 122 is substantially reduced.

Figure 8:
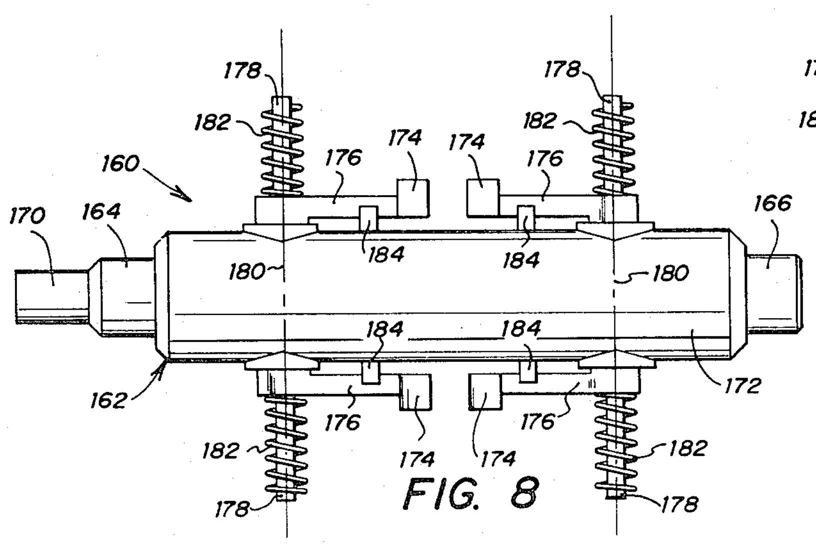
FIG. 8 is a top view of a variable amplitude vibratory apparatus incorporating a fourth embodiment of the invention.
Figure 9:
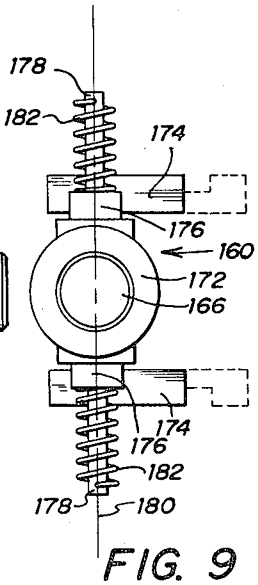
FIG. 9 is an end view of the embodiment of the invention shown in FIG. 8.
Figure 10:
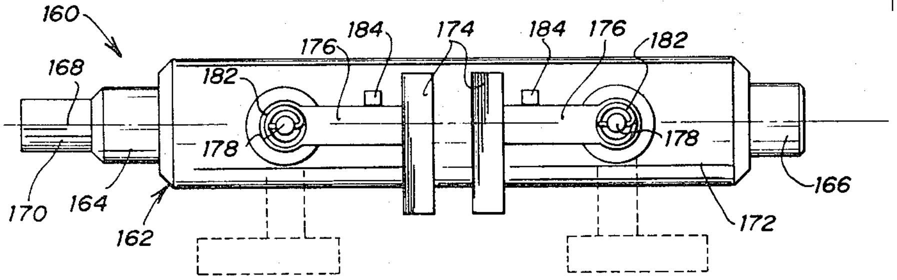
FIG. 10 is a side view of the embodiment of the invention shown in FIG. 8.

A fourth embodiment of the invention is illustrated in FIGS. 8, 9 and 10. A variable amplitude vibratory apparatus 160 comprises a shaft 162 which is adapted for use in a vibratory mechanism, for example a vibratory roller/compactor. The shaft 162 has a pair of opposed bearing portions 164 and 166 which define an axis of rotation 168. Rotation of the shaft 162 about the axis 168 is effected by means of structure 170 at the end thereof adjacent the bearing portion 164. The structure 170 may comprise an internal spline, an external spline, suitable gearing, or other conventional structure. The shaft 162 comprises a central portion 172 having a plurality of weights 174 supported thereon by means of arms 176. The arms 176 are pivotally supported on rods 178 for rotational movement about axes 180. A plurality of torsional springs 182 are also mounted on rods 178, and function to normally retain the arms 176 in engagement with stops 184.

The arms 176 remain in engagement with the stops 184 so that apparatus 160 is balanced until the rotational velocity of the shaft 162 exceeds a predetermined magnitude. Thereafter as the rotational velocity of the shaft 162 is further increased the weights 174 move away from the positions shown in full lines in FIGS. 9 and 10 towards the position shown in dashed lines therein, against the action of the torsional springs 182. It will thus be understood that the wr factor of the shaft 162 is caused to vary in accordance with the rotational velocity thereof.

Figure 11:
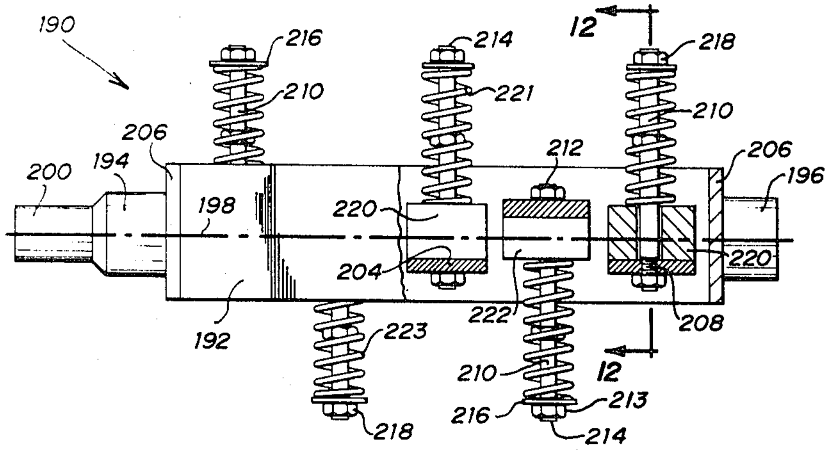
FIG. 11 is a side view of a variable amplitude vibratory apparatus incorporating a fifth embodiment of the invention in which certain parts have been broken away to more clearly illustrate certain features of the invention.
Figure 12:
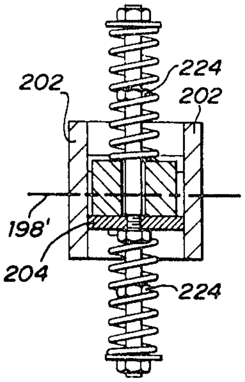
FIG. 12 is a sectional view taken generally along the line 12—12 of FIG. 11 in the direction of the arrows.

Referring to FIGS. 11 and 12, there is shown a variable amplitude vibratory apparatus 190 incorporating a fifth embodiment of the invention. The apparatus 190 comprises a shaft 192 for use in a vibratory mechanism, such as vibratory roller/compactor. The shaft 192 has a pair of opposed bearing portions 194 and 196 which define an axis of rotation 198. Rotation of the shaft 192 about the axis 198 is effected by means of structure 200 at the end thereof adjacent to bearing portion 194. The structure 200 may comprise an internal spline, an external spline, suitable gearing, or other conventional structure.

Referring to FIG. 12, the plane 198' shown therein is coincident with the axis of rotation 198 of the shaft 192. Shaft 192 comprises a spaced pair of side plates 202 which may be but are not necessarily symmetrical about the plane 198'. Cross members 204 are secured by welding between side plates 202 at spaced longitudinal locations therealong. Together with end plates 206, which are secured to side plates 202 as shown in FIG. 11, cross member 204 and side plates 202 cooperate to define the frame of shaft 192.

Each cross member 204 is offset from the axis of rotation 198 of shaft 192, and has a drilled and tapped hole 208 formed therein. Each rod 210 is provided with a reduced and threaded end portion 212 by which one rod 210 is threadedly secured to each cross member 204. Nuts 213 further secure rods 210 to cross member 204. Each of the rods 210 extends through the axis of rotation 198 of the shaft 192 and radially outwardly with respect thereto to a reduced and threaded end portion 214. Spring retainers 216 are mounted on the rods 210 and secured thereon by threaded engagement of nuts 218 with the reduced and threaded portions 214 of each rod 210.

A movable weight member 220 or 222 is slidably supported on alternate rods 210 of the shaft 192. Primary weight members 220 are normally retained slightly offset from axis 198 in the positions illustrated in FIG. 11 by means of springs 221. Secondary weight members 222 are normally retained by springs 223 in the positions illustrated in FIG. 11 and slightly offset from axis 198. Each spring 221 or 223 is concentric with a rod 210, and extends between the spring retainer 216 and the movable weight member 220 or 222. It will be understood that the spring rate, the mass of weight members 220 and 222, and the preloading of springs 221 and 223 depend upon the desired operating characteristics of the variable amplitude vibratory apparatus 190. It will also be understood that a plurality of weight members 220 and 222, and rods 210 may be associated with each cross member 204, if desired.

In the operation of the variable amplitude vibratory apparatus 190, movable weight members 220 and 222 are initially retained in the counterbalanced positions shown in FIG. 11, until the rotational velocity of shaft 192 reaches a first predetermined magnitude. At first predetermined magnitude, springs 221 become ineffective to retain primary weights 220, which gradually begin outward movement along rods 210. As the rotational velocity of shaft 192 increases, primary weight members 220 continue to move outwardly on rods 210 until engagement with stops 224 which are secured to rods 210. Thus, the amplitude of the vibratory apparatus 190 is controlled merely by varying the rotational shaft velocity within a first predetermined range. Constant maximum amplitude is maintained between the second predetermined rotational shaft velocity and a third higher predetermined value. As the rotational shaft velocity is increased beyond the third predetermined value, springs 223 are ineffective to resist outward movement of secondary weights 222, which begin to move outwardly along rods 210. As the rotational velocity of shaft 192 continues to increase, secondary weights 222 progress outwardly on rods 210 thus tending to counterbalance primary weights 220, until further movement thereof is prevented by stops 224. Accordingly, the amplitude of vibratory apparatus 190 is decreased as rotational shaft velocity is increased beyond the third predetermined magnitude.

It will be understood that the number of movable weight members 220 and 222 and the length of shaft 192 can vary over a wide range. However, in vibratory apparatus 190, a combined total of at least three movable weight members 220 and 222 are required to achieve balanced loading at the bearing portions 194 and 196.

Vibratory apparatus 190 may be set to produce specific amplitudes between wide ranges of rotational shaft velocity, instead of infinite amplitude adjustment between relatively narrower ranges of rotational shaft velocity. This is obtained by varying the spring rates of springs 221 and 223. For example, assume that springs 223 having a relatively low spring rate were used with secondary weights 222, that a spring 221 having a relatively higher spring rate were used to retain middle primary weight 220, and that springs 221 having an even higher relative spring rate were used with end primary weights 220. With this arrangement, as rotational shaft velocity is increased there is a first RPM range in which springs 221 and 223 are effective to retain weights 220 and 222, whereby the amplitude of vibratory apparatus 190 is zero. Following consecutively are three ranges of rotational shaft velocity corresponding to amplitudes produced by: the outward displacement of secondary weights 222, the outward displacement of secondary weights 222 as counterbalanced by the outward displacement of middle primary weight 220, and the outward displacement of secondary weights 222 and middle primary weight 220 as counterbalanced by the outward displacement of end primary weights 220. By utilizing more movable weights 220 and 222, and springs 221 and 223 of differing spring rates, it will be apparent that even more ranges of preselected amplitude are possible. As was previously described, maximum amplitude is varied by adjusting stops 224 and/or changing weights 220 and 222.

By way of example, a variable amplitude vibratory apparatus was constructed in accordance with FIGS. 11 and 12 and operated experimentally. Recordation of the operating characteristics indicated the following. Since the shaft was initially balanced, there was zero amplitude from 0 up to 1200 RPM. Between 1300 RPM and 1800 RPM, an amplitude of 0.060 inch was maintained. An amplitude of 0.045 inch was produced between 1900 RPM and 2200 RPM. The final range of 2300 RPM to 2800 RPM yielded four specific amplitude records from 0.045 inch through 0.015 inch in successive steps for each 100 RPM increase in shaft speed. Consequently, the vibratory apparatus 190 may be adjusted to produce specific amplitudes between relatively wide ranges of rotational shaft velocity, or to produce desired amplitude changes between relatively narrow ranges of rotational shaft velocity, depending upon the selection of springs, spring rates, stop positions, size of weight members, and number of weight members.

Figure 13:
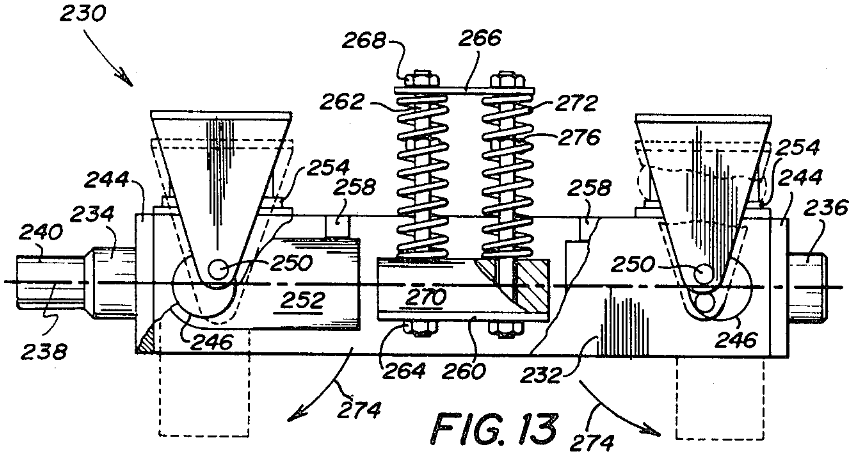
FIG. 13 is a side view of a variable amplitude vibratory apparatus incorporating a sixth embodiment of the invention in which certain parts have been broken away to more clearly illustrate certain features of the invention.
Figure 14:
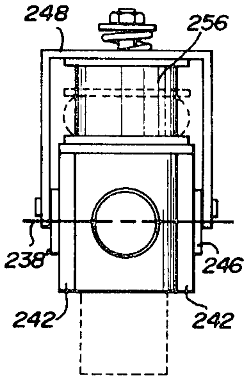
FIG. 14 is an end view of the embodiment of the invention illustrated in FIG. 13.

A sixth embodiment of the invention is illustrated in FIGS. 13 and 14. A variable amplitude vibratory apparatus 230 comprises a shaft 232 which may be used in a vibratory mechanism, such as a vibratory roller/compactor. The shaft 232 has a pair of opposed bearing portions 234 and 236 which define an axis of rotation 238. Rotation of shaft 232 is effected by means of structure 240 at the end thereof adjacent the bearing portion 234. The structure 240 may comprise an internal spline, and an external spline, suitable gearing or other conventional structure.

In reference to FIG. 14, plane 238' shown therein is coincident with the axis of rotation 238 of shaft 232. Shaft 232 comprises a spaced pair of side plates 242 secured to end plates 244. End plates 244 in conjunction with side plates 242 define the frame of shaft 232.

Pivot shafts 246 are located at both ends of frame 232 and are mounted for pivotal movement in side plates 242. The axis of rotation of each pivot shaft 246 may be, but is not necessarily coincident with plane 238'. To the outside of shaft 232, a yoke 248 is pivotally attached to each shaft 246 at point 250, which is offset from the rotational axis of shaft 246. To the inside of the frame of shaft 232, a primary movable weight 252 is mounted on each pivot shaft 246. Plates 254 are secured across the top edges of side plates 242 beneath yokes 248 and serve as base mountings for the elastomeric springs 256. Positioned between yokes 248 and plates 254 are elastomeric springs 256 which are preloaded and function through yokes 248 to generate a moment about the axis of each shaft 246 which forces primary weights 252 against stops 258 as shown in full lines in FIG. 13.

Cross member 260 is welded between side members 242 and is offset from plane 238'. Cross member 260 includes two drilled and tapped holes which receive reduced and threaded end portions of rods 262. Nuts 264 threadedly engage the reduced and threaded end portions of rods 262, thereby securing rods 262 to cross member 260. Rods 262 extend through the axis of rotation 238 of shaft 232 radially outwardly with respect thereto to other reduced and threaded end portions. Spring retainer 266 is mounted between rods 262 and is secured thereon by threaded engagment of nuts 268 with the end portions of rods 262.

Secondary weight member 270 is slidably supported on rods 262 of shaft 232. Weight member 270 is normally retained in the position shown in FIG. 13 by means of springs 272. Each spring 272 is concentrically arranged with one of the rods 262, and extends between spring retainer 266 and the secondary weight member 270. It will be understood that both the spring rate and the extent of preloading of spring 272 and 256 is a function of the desired operating characteristics of the variable amplitude vibratory apparatus 230.

The operation of vibratory apparatus 230 is as follows. Weight members 252 and 270 are normally retained in the positions shown in FIG. 13 so that vibratory apparatus 230 is initially balanced. Thus the wr factor is initially substantially zero and remains substantially zero as the rotational shaft velocity is increased to a first predetermined magnitude. At this first predetermined magnitude, primary weights 252 begin to pivot outwardly in the direction of arrows 274 in opposition to the torques exerted on shafts 246 by springs 256. As rotational shaft velocity is further increased, primary weights 252 finally attain the positions shown in dashed lines in FIGS. 13 and 14 which produce maximum amplitude in vibratory apparatus 230. As the rotational velocity of shaft 232 further increases to a second predetermined magnitude, secondary weight member 270 begins to move outwardly along rods 262 thus tending to counter-balance primary weights 252. As the rotational velocity of shaft 232 continues to increase to a predetermined magnitude, weight member 270 progresses outwardly on rods 262 until further movement thereof is prevented by stops 276 secured to rods 262. Thus, as the rotational shaft velocity of vibratory apparatus 230 is increased, the amplitude thereof is first increased from zero to a maximum value and then is decreased to a value below the maximum.

Figure 15:
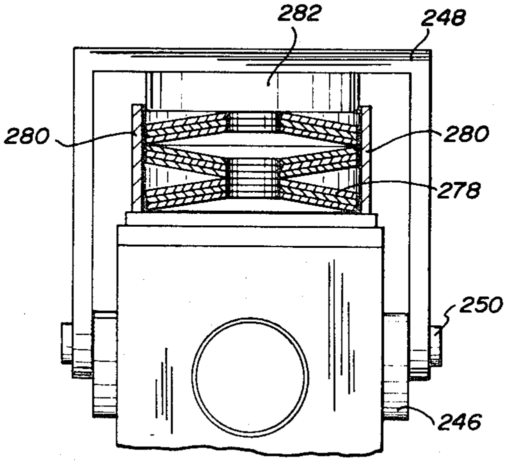
FIG. 15 is an enlarged partial end view showing a partial sectional view of a first modification of the embodiment of the invention shown in FIGS. 13 and 14.

Turning to FIG. 15, there is shown a first modification of the vibratory apparatus 230 shown in FIGS. 13 and 14. Instead of elastomeric springs 256, round disc springs 278 are used. The disc springs 278 are positioned within the circular enclosures 280 which is secured to the outer surface of cross plates 254, and beneath round portions 282 of yokes 248. At least two advantages are realized by the use of disc springs 278. First, owing to the reduced weight and mass of a disc spring, considerably less centrifugal force is developed thereby. Second, since the cumulative preloading a series of disc springs may be simply adjusted by adding or removing units thereof, operational scheduling of the variable amplitude vibratory apparatus 230 is thereby facilitated. Vibratory apparatus 230 utilizing disc springs 278 in all other respects functions as was hereinbefore described.

Figure 16:
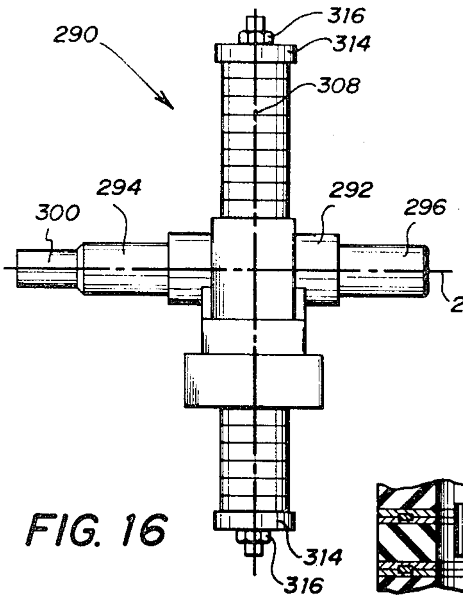
FIG. 16 is a side view of a variable amplitude vibratory apparatus incorporating a seventh embodiment of the invention.
Figure 18:
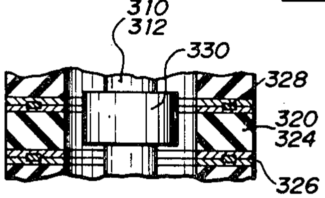
FIG. 18 is an enlarged cross sectional view of a portion of the embodiment of the invention shown in FIGS. 16 and 17.
Figure 17:
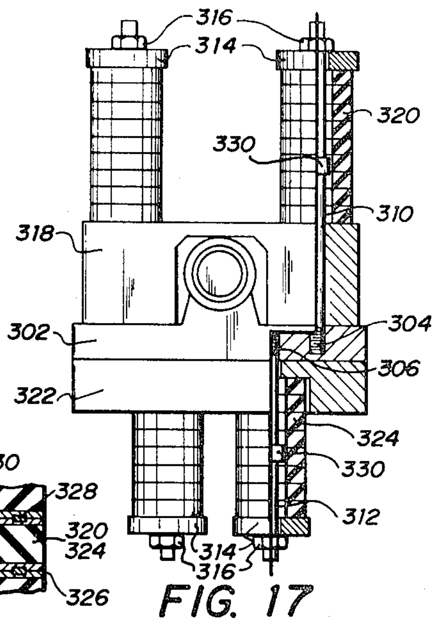
FIG. 17 is an end view of the embodiment of the invention shown in FIG. 16 in which certain parts have been broken away to more clearly illustrate certain features of the invention.

Referring now to FIGS. 16, 17 and 18, there is shown a variable amplitude vibratory apparatus 290 incorporating a seventh embodiment of the invention. The apparatus 290 comprises a shaft 292 having opposed bearing portions 294 and 296. The bearing portions 294 and 296 support the shaft 292 for rotation about an axis 298. Rotation of the shaft 292 is effected by means of structure 300 extending from the end thereof adjacent the bearing portion 294. The structure 300 may comprise an internal spline, suitable gearing or other conventional structure.

A member 302 is secured to shaft 292, as for instance by welding, for rigid cooperation therewith to define the frame of shaft 292. Member 302 includes two pairs of drilled and tapped holes, one pair of holes 304 being located on opposite sides of shaft 292 in the upper surface of member 302, and the other pair of holes 306 being located on opposite sides of shaft 292 in the lower surface of member 302. Drilled and tapped holes 304 and 306 are symmetrical with respect to shaft 292, being located in a plane 308 which is perpendicular to the axis of rotation 298. Two pairs of rods 310 and 312 are each provided with a reduced and threaded end portions which threadedly engage tapped hole pairs 304 and 306 respectively, whereby rods 310 and 312 are secured to member 302. Each of the rods 310 and 312 extends outwardly from the axis of rotation 298 and coincidentally with plane 308 to a reduced and threaded end portion. Spring retainers 314 are mounted near the distal ends of rods 310 and 312 and are secured thereon by threaded engagement of nuts 316 with the outward reduced and threaded portion of each rod 310 or 312.

A generally U-shaped movable weight member 318 is slidably supported on rods 310 of the shaft 292. Movable weight member 318 is normally retained in the position illustrated in FIGS. 16 and 17 by means of a plurality of elastomeric springs 320. The springs 320 are arranged in stacks concentric with rods 310. Movable weight member 322 is similarly slidably supported on rods 312 on the opposite side of member 302. Movable weight member 322 is normally retained in the position illustrated in FIGS. 16 and 17 by means of a plurality of elastomeric springs 324. The springs 324 are arranged in stacks concentric with rods 312. The springs 320 and 324 extend between spring retainers 314 and movable weight members 318 and 322 respectively. As is best shown in FIG. 18, elastomeric springs 320 and 324 are bonded between circular plates 326. Adjacent plates 326 include machined circular grooves which receive a circular key 328 therein. By this means, centrifugal forces are distributed through the stacks of elastomeric springs 320 and 324 without uneven deformation thereof. In addition, a stop 330 is mounted on each of the rods 310 and 312 within surrounding springs 320 and 324 respectively. It will be understood that both the spring rate and the preloading of the springs 320 and 324 is a function of the desired operating characteristics of the variable amplitude vibratory apparatus 290.

During operation of the vibratory apparatus 290, movable weight members 318 and 322 are initially retained in the positions illustrated in FIGS. 16 and 17. Shaft 292 is nominally balanced and remains that way until the rotational velocity thereof reaches a first predetermined magnitude, at which point movable weight member 322 begins outward movement along rods 312. As the rotational shaft velocity further increases, weight member 322 becomes progressively eccentric against the resistance of springs 324 until eventually contacting stops 330. At this point the wr factor of the vibratory apparatus 290 is maximized. At a second, higher predetermined magnitude of rotational shaft velocity weight member 318 begins to move outwardly along rods 310 against the resistance of springs 320 thus tending to counterbalance the eccentricity of weight member 322. Further outward movement of the movable weight member 318 is eventually limited by engagement thereof with stops 330 on rods 310, whereupon the overall wr factor of the variable amplitude vibratory apparatus 290 is substantially reduced.

Figure 19:
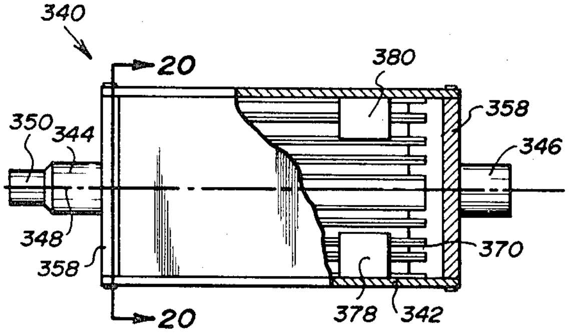
FIG. 19 is a side view of a variable amplitude vibratory apparatus incorporating an eighth embodiment of the invention in which certain parts have been broken away more clearly to illustrate certain features of the invention.
Figure 20:
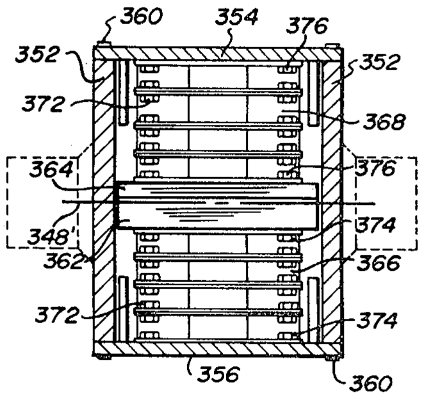
FIG. 20 is an enlarged sectional view taken generally along the line 20—20 of FIG. 19 in the direction of the arrows.

Referring to FIGS. 19 and 20, there is shown a variable amplitude vibratory apparatus 340 incorporating an eighth embodiment of the invention. The apparatus 340 comprises a shaft 342 which is adapted for use in a vibratory mechanism, such as a vibratory roller/compactor. The shaft 342 has a pair of opposed bearing portions 344 and 346 which define an axis of rotation 348. Rotation of the shaft 342 about the axis 348 is effected by means of structure 350 at the end thereof adjacent the bearing portion 344. The structure 350 may comprise an internal spline, an external spline, suitable gearing, or other conventional structure.

Referring to FIG. 20, the plane 348′ shown therein is coincident with the axis of rotation 348 of the shaft 342. Shaft 342 comprises a pair of side plates 352 which may be, but is not necessarily symmetrical about the plane 348′. Top and bottom plates 354 and 356 are demountably secured to end plates 358 by means of fasteners 360. End plates 358 are secured in turn to side plates 352, as for instance by welding, whereby plates 352, 354, 356 and 358 cooperate to define the box frame of shaft 342.

Because of the rigid construction of shaft 342, it will be understood that opposed bearing portions 344 and 346 may be mounted on side plates 352 instead of end plates 358. The alternate placement of bearing portions 344 and 346 shown in phantom lines in FIG. 20 comprises a significant feature of vibratory apparatus 340. In this manner, the apparatus may be oriented to present a relatively shorter shaft length, thereby affording some design flexibility when confronted with spacial constraints of various vibratory systems.

Positioned inside the box frame of shaft 342 are rectangular movable weights 362 and 364. Movable weight members 362 and 364 are normally retained in mutual engagement as shown in FIGS. 19 and 20 by means of a plurality of elastomeric springs 366 and 368. Springs 366 are arranged in a stack between primary weight member 362 and bottom plate 356. Springs 368 are arranged in a stack between secondary weight member 364 and top plate 354. Each of the elastomeric springs 366 and 368 is bonded between metal plates 370 of slightly greater relative length so as to form a flange. Fasteners 372 connect adjacent plates 370 to form the two stacks of springs 366 and 368. Screws 374 in turn fasten the stack of springs 366 between primary weight member 362 and plate 356. Similarly, screws 376 fasten the stack of springs 368 between secondary weight member 364 and 354. It will be understood that both the spring rates and the preloading of the springs 366 and 368 are a function of the desired operating characteristics of the variable amplitude vibratory apparatus 340.

The operation of vibratory apparatus 340 proceeds as follows. Movable weight members 362 and 364 are initially retained in the positions shown in FIGS. 19 and 20, whereby shaft 342 is balanced. Shaft 342 remains balanced as the rotational velocity thereof increases, until the retaining force of springs 366 is overcome by the centrifugal force of weight member 362. At this first predetermined rotational velocity, weight member 362 separates from weight member 364 and begins to move outwardly. As the rotational shaft velocity further increases, primary weight member 362 is eventually halted by stops 378, whereby maximum vibrational amplitude is achieved. At a second, higher predetermined rotational shaft velocity, secondary weight member 364 begins outward movement which tends to counter-balance shaft 342. Further outward movement of the secondary weight member 364 is finally limited by engagement thereof with stops 380, whereupon the wr factor of the variable amplitude vibratory apparatus 340 is substantially reduced.

Figure 21:
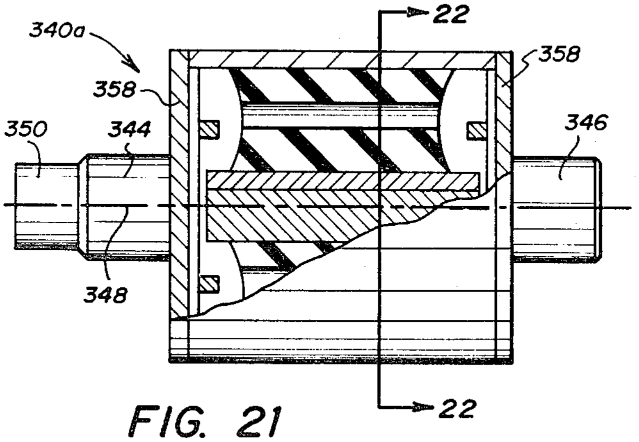
FIG. 21 is a side view of a first modification of the inventive embodiment shown in FIGS. 19 and 20 in which certain parts have been broken away more clearly to illustrate certain features of the invention.
Figure 22:
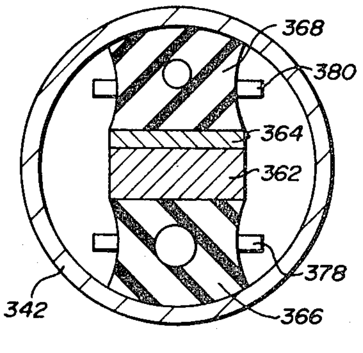
FIG. 22 is a sectional view taken generally along the line 22—22 of FIG. 21 in the direction of the arrows.

Turning to FIGS. 21 and 22, there is shown a first modification of the vibratory apparatus 340 shown in FIGS. 19 and 20. Instead of a box-like frame, the shaft 342 of vibratory apparatus 340*a* comprises a cylindrical housing. Rectangular movable weight members 362 and 364 are positioned inside the frame of shaft 342 and are normally retained in mutual engagement by means of elastomeric springs 366 and 368. Each elastomeric spring 366 and 368 is of one piece construction, and is bonded directly between the frame of shaft 342 and movable weight member 362 or 364 respectively. Stops 378 and 380 are secured to the inside of end plates 358 to limit outward displacement of weight members 362 and 364. In addition, guides (not shown) may be used to keep the weight members 362 and 364 square during outward movement thereof. Vibratory apparatus 340*a* in all other respects functions as was hereinbefore described with regard to vibratory apparatus 340.

Figure 23:
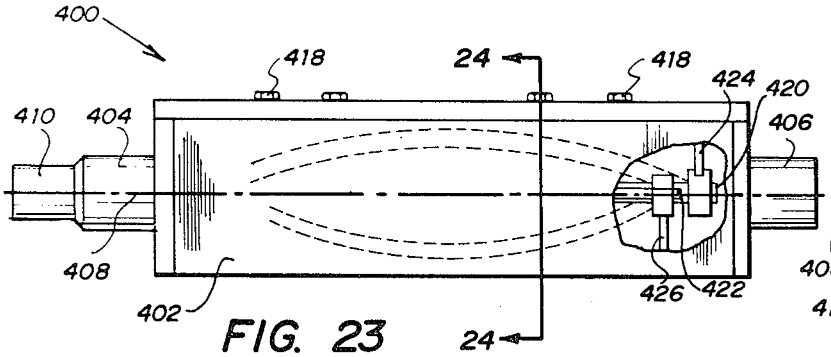
FIG. 23 is a side view of a variable amplitude vibratory apparatus incorporating a ninth embodiment of the invention in which certain parts have been broken away more clearly to illustrate certain features of the invention.
Figure 24:
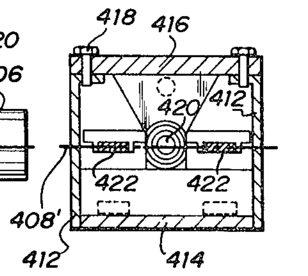
FIG. 24 is a sectional view taken generally along the line 24—24 of FIG. 23 in the direction of the arrows.

Having reference to FIGS. 23 and 24, there is shown a variable amplitude vibratory apparatus 400 incorporating a ninth embodiment of the invention. The apparatus 400 comprises a shaft 402 which is adapted for use in a vibratory mechanism, such as a vibratory roller/compactor. The shaft 402 has a pair of opposed bearing portions 404 and 406 which define an axis of rotation 408. Rotation of the shaft 402 about the axis 408 is effected by means of structure 410 at the end thereof adjacent the bearing portion 404. The structure 410 may comprise an internal spline, an external spline, suitable gearing, or other conventional structure.

Referring to FIG. 24, the plane 408' shown therein is coincident with the axis of rotation 408 of the shaft 402. Shaft 402 comprises a pair of side plates 412 which are symmetrical about the plane 408' and which are secured to base plate 414 as for instance by welding. Cover plate 416 is likewise symmetric to base plate 414 and is demountably secured to side plates 412 by means of fasteners 418. Accordingly, plates 412, 414 and 416 cooperate to define the box frame of shaft 402.

Positioned inside the box frame of shaft 402 are movable weight members 420 and 422. Movable weight members 420 and 422 are constructed of a resilient material, such as spring steel, plastic or rubber compounds, or other suitable material which is resistant to deformation. Accordingly, weight members 420 and 422 simultaneously serve dual functions, that of spring members as well as weight members. Consequently, weight members 420 and 422 normally occupy the nondeformed positions shown in full lines in FIGS. 23 and 24, which positions are slightly offset from the rotational axis 408. Shown in a circular solid configuration, the ends of weight member 420 are secured to self-aligning bearings (not shown) mounted in brackets 424. Brackets 424 in turn are attached to the inside surface of cover plate 416. Similarly offset and symmetrical about axis 408, weight members 422 are clamped loosely in brackets 426 so as to allow outward movement without binding. The brackets 426 are attached in turn to the inside surface of base plate 414. Thus, weight members 420 and 422 are connected with flexible joints (not shown) to brackets 424 and 426 respectively, so as to withstand repeated bending thereby resisting fatigue which would cause early breakage. It will be understood that the specific materials selected and the specific dimensions of weight members 420 and 422 are a function of the desired operating characteristics of the variable amplitude vibratory apparatus 400.

During operation of the vibratory apparatus 400, weight members 420 and 422 are initially positioned as shown in full lines such that shaft 402 is balanced. Shaft 402 remains balanced until the rotational velocity thereof increases to a first predetermined magnitude, at which point weight members 422 commence outward deflection. As the rotational shaft velocity further increases, weight members 422 become progressively deformed as shown in dashed lines in FIGS. 23 and 24 until constrained by base plate 414. At this point the wr factor of the vibratory apparatus 400 is maximized, and held at a constant value until rotational shaft velocity increases to a second predetermined magnitude. At this point, weight member 420 begin outward deflection thus tending to counterbalance the eccentricity of weight members 422. Further deformation of weight member 420 is limited by engagement thereof with cover plate 416, whereupon the overall wr factor of the variable amplitude vibratory apparatus 400 is substantially reduced.

Figure 25:
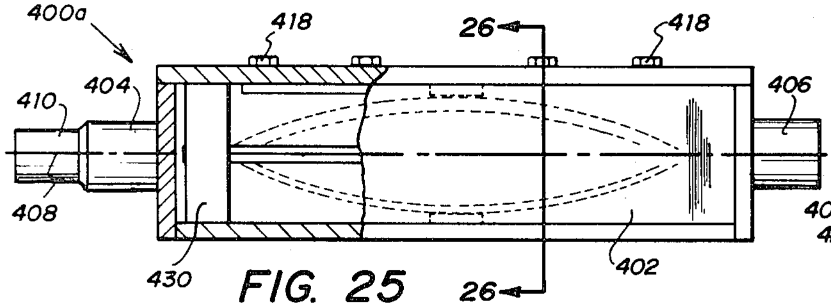
FIG. 25 is a side view of a first modification of the inventive embodiment shown in FIGS. 23 and 24 in which certain parts have been broken away more clearly to illustrate certain features of the invention.
Figure 26:
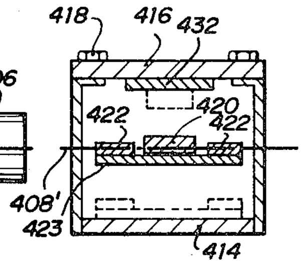
FIG. 26 is a sectional view taken generally along the line 26—26 of FIG. 25 in the direction of the arrows.

Turning to FIGS. 25 and 26, there is shown a first modification of the vibratory apparatus 400 shown in FIGS. 23 and 24. In vibratory apparatus 400*a*, the weight members 420 and 422 are mounted between a common pair of blocks 430, instead of separate pairs of brackets. Blocks 430 are secured at opposite ends within the frame of shaft 402, and are preferably constructed of a resilient material, such as a plastic or rubber compound having load carrying capability. If desired, weight members 420 and 422 may be potted within block 430, or connected thereto by other conventional means. In addition, weight members 422 are secured together at midlength by a cross member 423. Cross member 423 helps to control the outward movement of weight members 422 toward the position shown in dashed lines in FIG. 26 against the base plate 414, which direction of movement is opposite the outward movement of weight member 420. Spacer 432 may be attached to the inside of cover plate 416 to limit displacement of weight member 420, if desired. Vibratory apparatus 400*a* in all other respects functions as was hereinbefore described with regard to vibratory apparatus 400.

Figure 27:
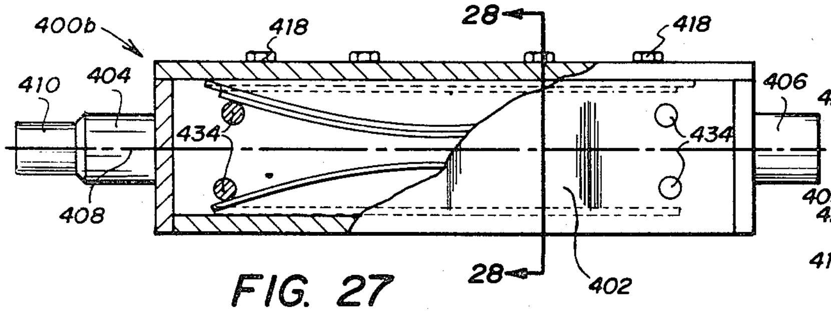
FIG. 27 is a side view of a second modification of the inventive embodiment shown in FIGS. 23 and 24 in which certain parts have been broken away more clearly to illustrate certain features of the invention.
Figure 28:
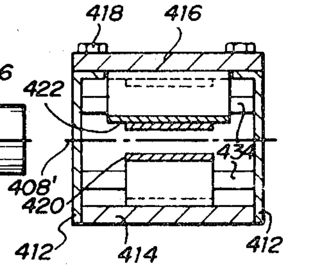
FIG. 28 is a sectional view taken generally along the line 28—28 of FIG. 27 in the direction of the arrows.

Now turning to FIGS. 27 and 28, there is shown a second modification of the vibratory apparatus 400 shown in FIGS. 23 and 24. Vibratory apparatus 400*b* features two semi-elliptical leaf springs as weight members 420 and 422. Supported within the shaft 402 by cross rods 434 extending between side plates 412. In this modification the leaf springs have a semi-elliptical form in the relaxed, initial state. Under the influence of centrifugal force, weight/spring members 420 and 422 assume a relatively straighter configuration. Accordingly, rotational shaft velocity causes weight/spring members 420 and 422 to flatten out toward the positions shown in dashed lines in FIG. 27. In all other respects, vibratory apparatus 400*b* functions as was hereinbefore described with regard to vibratory apparatus 400.

Figure 29:
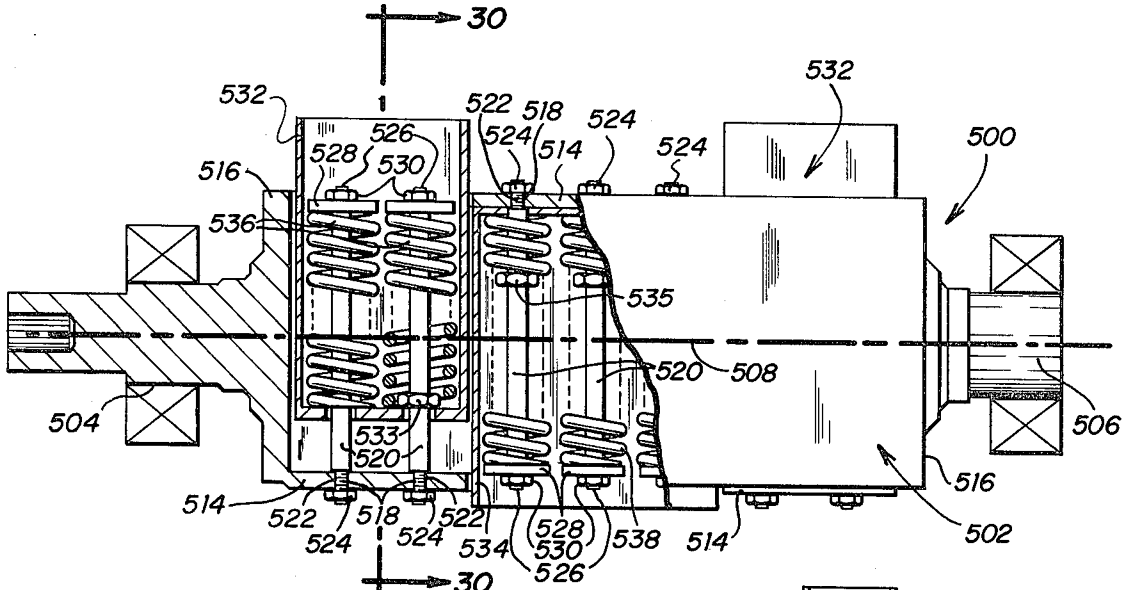
FIG. 29 is a side view of a variable amplitude vibratory apparatus incorporating a tenth embodiment of the invention in which certain parts have been broken away to more clearly illustrate certain features of the invention.
Figure 30:
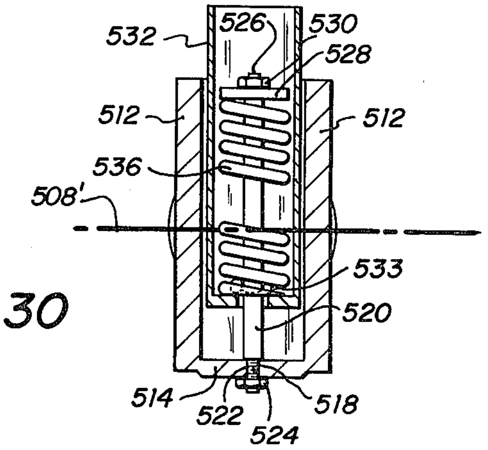
FIG. 30 is a sectional view taken generally along the line 30—30 of FIG. 29 in the direction of the arrows.

Referring to FIGS. 29 and 30, there is shown a variable amplitude vibratory apparatus 500 incorporating a tenth embodiment of the invention. The apparatus 500 comprises a shaft 502 for use in a vibratory mechanism, such as a vibratory roller/compactor. The shaft 502 has a pair of opposed bearing portions 504 and 506 which define an axis of rotation 508. Rotation of the shaft 502 about the axis 508 is effected by conventional drive means.

Referring to FIG. 30, plane 508' shown therein is coincident with the axis of rotation 508 of the shaft 502. Shaft 502 comprises a spaced pair of side plates 512 which may be but are not necessarily symmetrical about the plane 508', and a plurality of base plate sections 514. Base plate sections 514 extend between the edges of side plates 512 for only a portion of the length of shaft 502. Base plate sections 514 are secured on opposite edges of side plates 512 in an alternate fashion along the length of shaft 502. Together with end plates 516, which are secured to side plates 512 and several base plate sections 514 as shown in FIG. 29, plates 512 and 514 cooperate to define the frame of shaft 502.

Base plate sections 514 have a plurality of drilled and tapped holes 518 formed therein for receiving one end of a plurality of rods 520. Each rode 520 is provided with a reduced and threaded end portion 522 by which one rod 520 is threadedly secured in each hole 518. Nuts 524 further secure rods 520 to base plate 514. Each of the rods 520 extends through the axis of rotation 508 of the shaft 502 and radially outwardly with respect thereto to a reduced and threaded end portion 526. The center of mass of each rod 520 coincides with the axis of rotation 508. Spring retainers 528 are mounted on the rods 520 and secured thereon by threaded engagement of nuts 530 with the reduced and threaded portion 526 of each rod 520. Spring retainers 528 apply a predetermined preload to the helical compression springs 536 and 538.

A movable weight member 532 or 534 is slidably supported on rods 520 of the shaft 502. Primary weight member(s) 532 are normally retained slightly offset from axis 508 in a position abutting a base plate section 514 by means of preloaded springs 536. Secondary weight member(s) 534 are normally retained by preloaded springs 538 in the position illustrated in FIG. 29 also abutting a base plate section 514 and slightly offset from axis 508 in a direction opposite the primary weight member offset and on the other side of the axis of rotation. Each spring 536 and 538 is concentric with a rod 520, and extends between the spring retainer 528 and the movable weight member 532 or 534. The springs are preloaded to resist the centrifugal force developed by the slight offset of the movable weight members up to a predetermined rotational velocity. At that velocity, the centrifugal force overcomes the preload and the weight member moves outward along the rods. The center of mass of each spring 536 and 538 is normally coincident with the axis of rotation 508 when preloaded and the weight members are slightly offset from axis 508 to balance the shaft 502.

Figure 31:
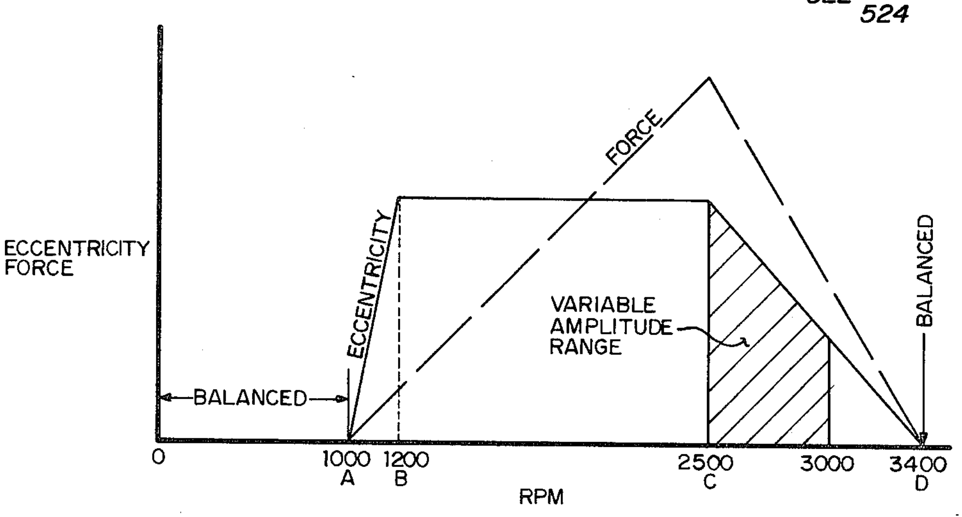
FIG. 31 is a graph showing typical operating characteristics of the invention.

The operation of the variable amplitude vibratory apparatus 500 is best illustrated in the graph of FIG. 31 using typical values of rotational velocity. Using apparatus 500 as an example, the movable weight members 532 and 534 are initially retained in the slightly offset position abutting the base plate sections 514 by the preload of compression of springs 536 and 538 until the rotational velocity of shaft 502 reaches the first predetermined rotational velocity A of a magnitude of 1000 RPM. Until this first predetermined magnitude is achieved, the vibratory apparatus 500 is completely balanced which results in a substantially lower rotational inertia in apparatus 500 than could be achieved with an apparatus with the same force rating having springs centered off the rotational axis. This permits use of a less powerful rotating mechanism providing increased angular acceleration to the vibrational mode, with consequential savings in production, time and money.

At the first predetermined rotational velocity A of a magnitude of 1000 RPM, the preloaded or offset springs 536 yield to the centrifugal force developed by the original imbalance of the primary weight member(s) 532 abutting the base plate sections 514. Primary weight member(s) 532 gradually begin outward movement along rods 520 and cause an eccentricity in the apparatus 500. As springs 536 are compressed by the outward movement of primary weight member(s) 532, the center of mass of the springs 536 move off the axis of rotation 508 and in the same direction as the movement of primary weight member(s) 532. Thus, the weight of springs 536 also creates an eccentricity of the apparatus 500 which supplements the eccentricity induced by the primary weight member(s). In this manner, a smaller primary weight member and spring may be employed to achieve a given eccentricity than would be necessary if only the weight member is used to create the eccentricity, which reduces the mass and inertia of the shaft. As the rotational velocity of apparatus 500 increases, primary weight member(s) 532 and the center of mass of springs 536 continue to move outwardly guided by rods 520. At a second predetermined rotational velocity B of magnitude of 1200 RPM, further outward movement of the primary weight member(s) is prevented by the member(s) engagement with stops 533. At velocity B the eccentricity of apparatus 500 is maximized. Thus, the amplitude of the vibratory apparatus 500 is controlled by varying the rotational shaft velocity within a first predetermined range between the first and second predetermined rotational shaft velocity. The springs 536 can be chosen to selectively determine the relative increase in shaft velocity in the first predetermined range. Constant maximum eccentricity and amplitude are maintained between the second predetermined rotational shaft velocity B and a third higher predetermined value C of a magnitude of 2500 RPM, however, during the increase of rotational shaft velocity from point A to C, the vibratory force constantly increases to a maximum value at point C.

As the rotational shaft velocity increases beyond the third predetermined value C, the preloaded springs 538 yield to the centrifugal force developed by the original imbalance or offset of the secondary weight member(s) 534, which begin to move outwardly guided by rods 520. As the rotational velocity of apparatus 500 continues to increase, secondary weight member(s) 534 progresses outwardly guided by rods 520, thus tending to counterbalance the eccentricity of primary weight member(s) 532 and springs 536 and reduce the eccentricity of apparatus 500. Springs 538 are compressed by the outward movement of secondary weight member(s) 534 and their center of mass moves off the axis of rotation 508 in the same direction as the movement of secondary weight member(s) 534 which is opposite to the direction of movement of the primary weight member(s) 532. Springs 538 thereby supplement the reduction in eccentricity of apparatus 500 and permit the use of a smaller secondary weight member and spring. As the secondary weight member(s) 534 and springs 538 move outwardly as the rotational velocity of apparatus 500 increases above the third predetermined rotational velocity C to a point again balancing the apparatus 500, the eccentricity, amplitude and vibratory force of apparatus 500 are infinitely variable within the limits from zero to the maximum value at point C, giving the operator of the apparatus 500 an ideal choice of amplitude for each application. The size of the variable amplitude range can be varied in accordance with particular requirements.

At a fourth predetermined rotational velocity D of a magnitude of 3400 RPM, further outward movement of the secondary weight member(s) is prevented by the member(s) engagement with stops 535. At this point the secondary weight member(s) 534 and springs 538 substantially counterbalance primary weight member(s) 532 and springs 536, thereby reducing the eccentricity of apparatus 500 and the vibratory force to zero. This result is a significant feature of the present invention as the operator of the vibratory apparatus may reach a velocity having no vibratory force or eccentricity by either reducing the rotational velocity below the first predetermined rotational velocity A or increasing the velocity above the fourth predetermined rotational shaft velocity D. This feature permits a more rapid translation from the vibratory to non-vibratory modes and this characteristic is appropriately called "non-stop vibration".

A primary advantage in the use of the present invention involves the fact that vibratory action is not limited to selection between "off" and "on" modes, but is variable within a second predetermined range between the third and fourth predetermined rotational velocities. The springs 538 used to control the secondary weight member(s) 534 are selected to have the capacity to regulate the movement of the secondary weight member(s) at any particular frequency. This affords very precise control over the operation of the apparatus.

Another significant feature of this embodiment, also present in the other embodiments disclosed herein, is that the shaft assembly is balanced in the lower frequency range where an undesirable system resonance is developed in prior art devices. This uncontrollable system resonance encountered in accelerating or decelerating prior art devices between the shut down mode and the operating range is destructive in nature, shortening the service of adjacent component parts and inflicting irreversible damage on fragile mixes of asphalt when the devices are used in a vibratory roller/compactor.

Figure 33:
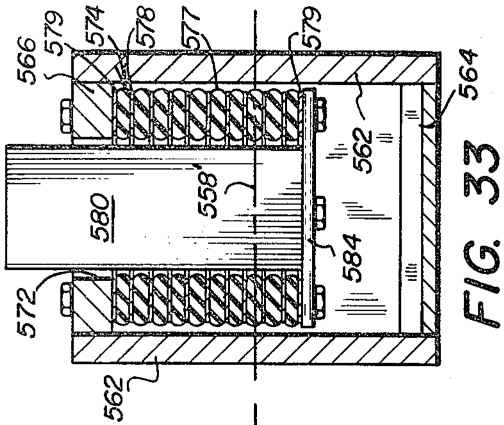
FIG. 33 is a sectional view taken generally along the line 33—33 of FIG. 32 in the direction of the arrows.
Figure 32:
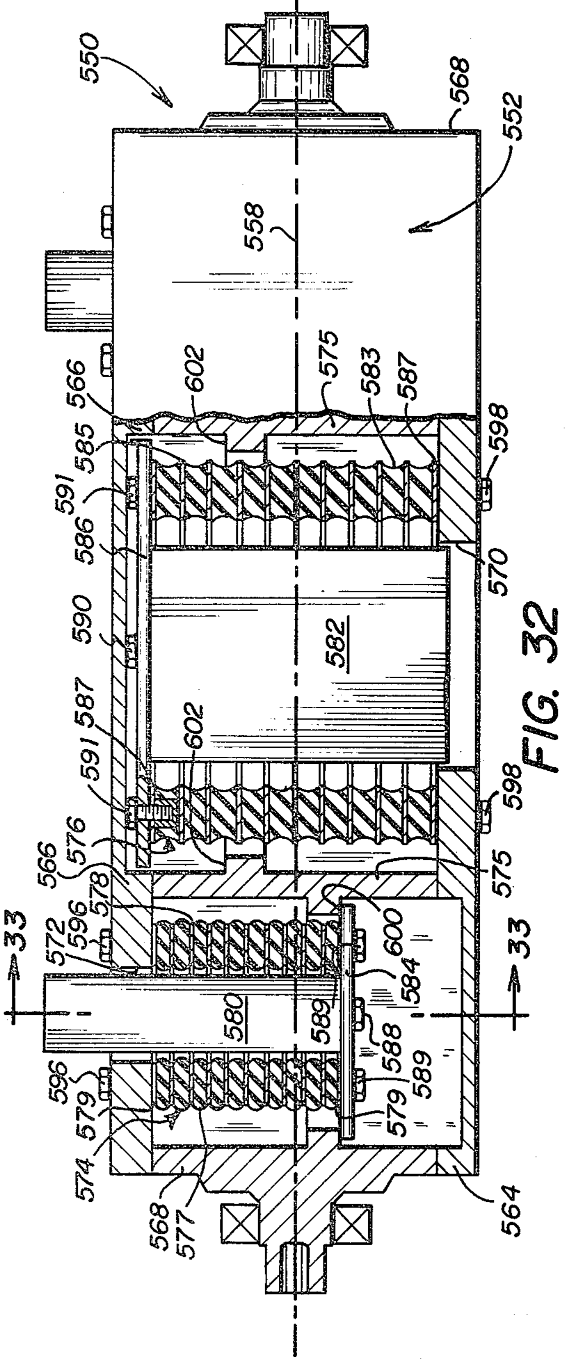
FIG. 32 is a side view of a variable amplitude vibratory apparatus incorporating an eleventh embodiment of the invention in which certain parts have been broken away to more clearly illustrate certain features of the invention.

An eleventh embodiment of the invention is illustrated in FIGS. 32 and 33. The variable amplitude vibratory apparatus 550 comprises a shaft 552 which may be used in a vibratory mechanism, such as a vibratory roller/compactor. Rotation of the shaft 552 about the axis of rotation 558 is effected by conventional drive means.

In reference to FIG. 33, plane 558' shown therein is coincident to the axis of rotation 558 of shaft 552. Shaft 552 comprises a spaced pair of side plates 562, bottom plate 564 and a top plate 566. End plates 568 are secured in turn to plates 562, 564, and 566, as for instance by welding, whereby plates 562, 564, 566 and 568 cooperate to define the box frame of shaft 552. Top plate 566 has a pair of apertures 572 and bottom plate 564 has an aperture 570 formed therein.

A plurality of rectangular spring means 574 and 576 having rectangular apertures therein are positioned within the box frame of shaft 552 and separated by bulkheads 575. Spring means 574 in this embodiment are constructed of multiple layers of elastomeric material 577 having a rectangular outer shape with an aperture therein bonded to metal plates 578 and end plates 579. Positioned within the inner perimeter of spring means 574 is a rectangular movable weight member 580. A rectangular movable weight member 582 is positioned within the inner perimeter of spring means 576 which is constructed of multiple layers of elastomeric material 583 having a rectangular outer shape and aperture bonded to metal plates 585 and end plates 587. Primary movable weight member 580 is rigidly fastened at one end to spring retainers 584 by means of fasteners 588. One end plate 579 of spring means 574 is fastened about the outer periphery of the spring retainer 584 by common means such as fasteners 589. The end plate 579 at the opposite end of the spring means 574 is fastened to the top plate 566 by fasteners 596 about the periphery of apertures 572 so that the primary movable weight member 580 may extend through aperture 572. Secondary movable weight member 582 is similarly fastened to spring retainer 586 by fasteners 590. One end plate 587 of spring means 576 is fastened about the outer periphery of spring retainer 586 by common means such as fasteners 591. The end plate 587 at the opposite end of spring means 576 is secured to the bottom plate 564 by fasteners 598 about aperture 570 so that secondary movable weight member 582 may be passed therethrough.

The spring means 574 are preloaded to retain the movable weight members 580 slightly offset from axis 558 in the direction of aperture 572 in a position abutting the bottom plate 564 through spring retainer 584 and fasteners 588 and 589. The spring means 576 is preloaded to retain the movable weight member 582 slightly offset from axis 558 in the direction of aperture 570 and abutting the top plate 566 through spring retainer 586 and fasteners 590 and 591 as shown in FIG. 32. The spring means are preloaded to resist the centrifugal force developed by the slight offset of the movable weight members up to a predetermined rotational velocity. At that velocity, the centrifugal force overcomes the preload and the weight members move outwardly through the apertures. The spring means 574 and 576 and spring retainers 584 and 586 form a combined support/spring structure with a center of mass initially coincident with the axis of rotation 558. This provides similar advantages to those discussed above with reference to springs 536 and 538 by resulting in a substantially lower rotational inertia and apparatus 550 than could be achieved with an apparatus with the same force rating having springs centered off the rotational axis.

The operation of vibratory apparatus 550 proceeds as follows, reference again being had to FIG. 31. Movable weight members 580 and 582, and the support/spring structure cause shaft 552 to remain balanced until a first predetermined rotational velocity A is achieved, at which point the preload on the spring means 574 are overcome by the centrifugal force of primary movable weight members 580. At this first predetermined rotational velocity A, the primary movable weight members 580 begin to move outward through apertures 572. The rate of movement of the primary weight members 580 are determined by the strength of spring means 574 which are selected to suit each application. The primary movable weight members 580 are guided by apertures 572 and the aperture defined by side plates 562, plate 564, plate 568 and bulk-head 575 encompassing the spring retainer 584, although the spring means 574 is designed with a large degree of stability. As the rotational shaft velocity increases to a higher, second predetermined rotational velocity B, primary movable weight members 580 are halted by stops 600, at which point maximum eccentricity and vibrational amplitude is achieved. At a higher, third predetermined rotational shaft velocity C, the centrifugal force generated by the offset of the secondary weight member 582 exceeds the preload force on the spring means 576. At this velocity, secondary movable weight member 582 begins outward movement through aperture 570. The secondary movable weight member 582 is guided by aperture 570 and the aperture defined by side plates 562 and bulk-heads 575, although spring means 576 is designed with a large degree of stability. That movement tends to counterbalance the eccentricity of the primary movable weights 580 and spring means 574. Further outward movement of the secondary movable weight member 582 is limited by engagement with stops 602 at a fourth, higher predetermined rotational shaft velocity D. At this fourth predetermined rotational shaft velocity D, shaft 552 is again balanced. As movable weight members 580 and 582 are moved outwardly, spring means 574 and 576 are compressed, thereby moving the center of mass of the support/spring structure in the direction of the motion of the corresponding movable weight members. This movement of the center of mass supplements the eccentricity of the corresponding movable weight members and permits an apparatus 550 to generate larger vibrational forces than would be possible by use of the movable weight member alone.

Again, a primary advantage in the use of the present invention, as embodied in apparatus 550 illustrated in FIGS. 32 and 33, involves the fact that vibratory action is not limited to selection between "off" and "on" modes, but is variable within a predetermined range. The spring means 576, used to control the secondary movable weight member 582, is selected to have the capacity to regulate the movement of the secondary movable weight member 582 at any particular frequency. The selection of spring means 576 permits the amplitude to be selectively variable within the predetermined range from rotational velocity C to D, as shown in FIG. 31. This affords very precise control over the operation of the apparatus 550.

Figure 35:
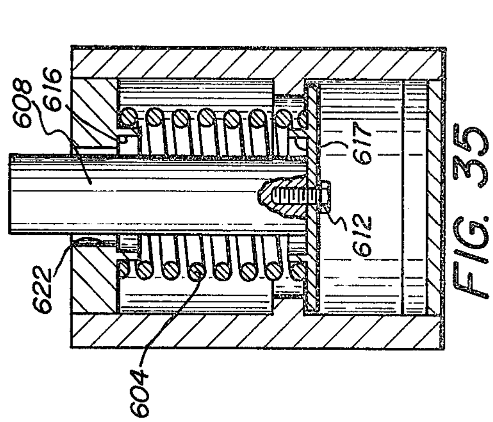
FIG. 35 is a sectional view taken generally along the line 35—35 of FIG. 34 in the direction of the arrows.
Figure 34:
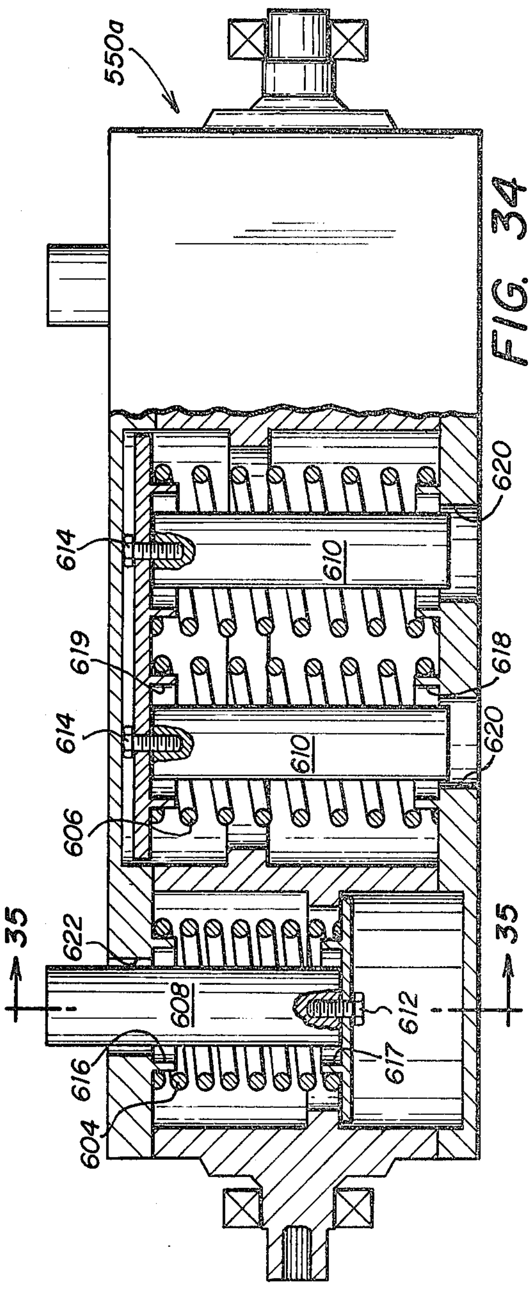
FIG. 34 is a side view of a first modification of the inventive embodiment shown in FIGS. 32 and 33 in which certain parts have been broken away to more clearly illustrate certain features of the invention.

Turning now to FIGS. 34 and 35, there is shown a first modification of the vibratory apparatus 550 shown in FIGS. 32 and 33. Instead of spring means 574 and 576, and metal plates 578, the combined support/spring structure of vibratory apparatus 550*a* comprises helical compression spring members 604 and 606. Movable weight members 580 and 582 are replaced by circular movable weight members 608 and 610. Fasteners 588, 589, 590, 591, 596 and 598 are replaced by fasteners 612 and 614 and spring centering collars 616, 617, 618, and 619. Vibratory apparatus 550*a* operates in a manner as was hereinbefore described with regard to vibratory apparatus 550 and retains the advantages of apparatus 550 by selecting helical compression spring members 606 to selectively vary the amplitude in a predetermined range between the third and fourth predetermined rotational velocities C and D. Vibratory apparatus 550*a* further retains the feature of lowered rotational inertia.

Figure 36:
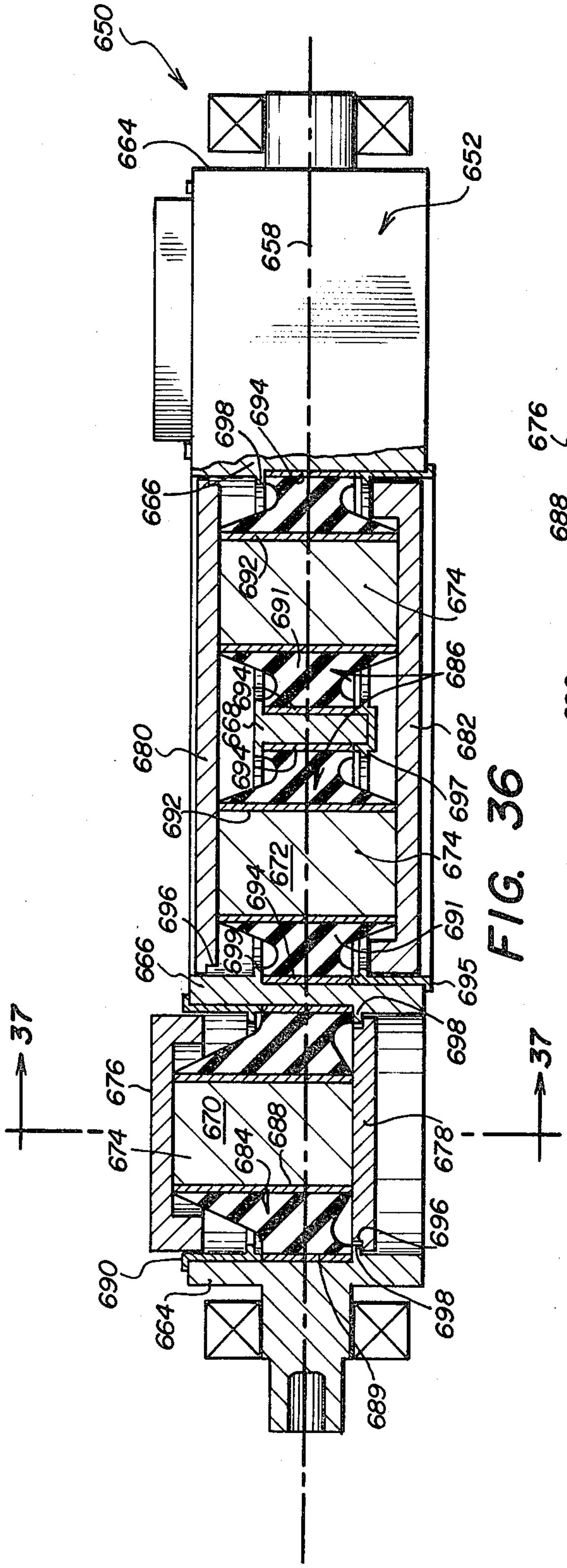
FIG. 36 is a side view of a variable amplitude vibratory apparatus incorporating a twelfth embodiment of the invention in which certain parts have been broken away to more clearly illustrate certain features of the invention.
Figure 37:
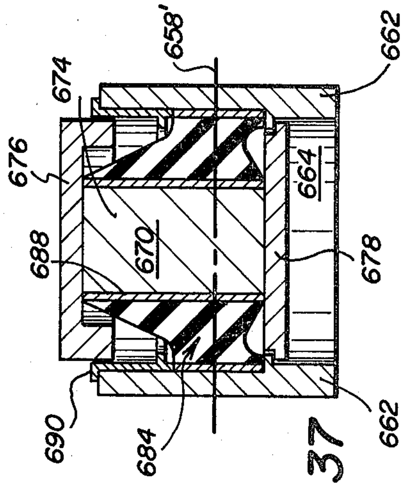
FIG. 37 is a sectional view taken generally along the line 37—37 of FIG. 36 in the direction of the arrows.

Referring now to FIGS. 36 and 37, there is shown a variable amplitude vibratory apparatus 650 incorporating a twelfth embodiment of the invention. Rotation of the shaft 652 about the axis of rotation 658 is effected by conventional drive means.

Referring to FIG. 37, the plane 658′ shown therein is coincident with the axis of rotation 658 of the shaft 652. Shaft 652 comprises a cast or fabricated member having round and oblong apertures therein for receiving movable weight members. The shaft is formed of a pair of sides 662 which are symmetrical about the plane 658′ and a pair of ends 664. Sides 662 are further connected by frame members 666 and cross member 668 centered with respect to the axis of rotation 658. Accordingly, sides 662, ends 664 and members 666 and 668 cooperate to define shaft 652.

Positioned inside the round or circular apertures of shaft 652 are primary movable weight members 670 and positioned within the oblong aperture of shaft 652 is a secondary movable weight member 672. Primary movable weight members 670 comprise a circular core section 674, and circular cap sections 676 and 678 secured at the ends of core sections 674. Secondary movable weight member 672 comprises two core sections 674 interconnected by common oblong cap sections 680 and 682 secured at the ends of the core sections 674. The cap sections are fitted within shaft 652 such that the circular and oblong apertures of shaft 652 act as guide members. Elastomeric spring members 684 and 686 are also positioned within shaft 652. Elastomeric spring members 684 comprise an elastomeric material 687 bonded on its inner surface to cylindrical member 688 surrounding the core section 674 of primary movable weight member 670 and at its outer surface to cylindrical member 689. A sleeve 690 is pressed in the circular aperture and secured by conventional means to retain the elastomeric spring member 684 within shaft 652. The core 674 may then be inserted in cylindrical member 688 so that cap portion 678 contacts member 688. The cap portion 676 of the primary movable weight member 670 may then be fastened to the core 674 to retain member 670 in shaft 652. Elastomeric spring members 686 comprise elastomeric material 691 bonded on its inner surface to cylindrical members 692 surrounding core sections 674 of secondary movable weight member 672, and on its outer surfaces to cylindrical members 694. Member 686 is secured to frame members 666 and 668 by sleeves 695 nd 697. The height of caps 676 and 682 are chosen to preload the elastomeric spring members 684 and 686 by abutting against a circular lip formed in sleeves 690 and 695. Cap sections 678 and 680 are flanged to cooperate with the flanges 698 and 699, respectively in the frame member to act as a stop.

The operation of vibratory apparatus 650 proceeds as follows, again having reference to FIG. 31. Below a first predetermined rotational velocity A, spring members 684 and 686 are preloaded by cap members 676 and 682 abutting the lips of sleeves 690 and 695. In this position, the centers of mass of spring members 684 and 686 are coincident with the axis of rotation 658. The primary weight members 670 and secondary weight members 672 are slightly offset from axis 658 in the directions of caps 676 and 682, respectively, with shaft 652 being balanced. The preload of the elastomeric spring members determines at what rotational velocity the weight members will start moving as the centrifugal force generated by the offset exceeds the preload. At the first predetermined rotational velocity A, the centrifugal force generated by the primary weight members 670 overcomes the preload of elastomeric spring members 684 and the primary weight members 670 begin to move outwardly. As the rotational velocity further increases to a second predetermined velocity B, primary weight members 670 are halted by stops 698 as shown in FIG. 36 whereby maximum vibrational amplitude is achieved. At a third, higher predetermined rotational shaft velocity C, secondary weight member 672 begins outward movement which tends to counterbalance the eccentricity of primary weight members 670. Further outward movement of secondary weight member 672 is limited at a higher, fourth predetermined rotational velocity D by engagement thereof with stop 699, whereupon the apparatus 650 is substantially balanced. The center of mass of elastomeric spring members 684 and 686 in the preload condition below the first predetermined rotational velocity A are initially coincident with the axis of rotation 658. Upon movement of weight members 670, the center of mass of elastomeric spring members 684 move in the same direction as the primary weight members 670 and somewhat increases the vibratory force of apparatus 650. The center of mass of elastomeric spring members 686 similarly moves in the direction corresponding to the movement of secondary weight member 670. This motion permits somewhat larger vibratory forces to be generated than could be obtained by use of the movable weight alone.

Again, a primary advantage in the use of the present invention as embodied in apparatus 650 involves the fact that elastomeric spring members 686 may be selected to have the capacity to regulate the movement of the secondary movable weight member 672 at any particular frequency. The vibratory amplitude of apparatus 650 is selectively variable within the predetermined range between the third and fourth predetermined rotational velocities C and D.

From the foregoing it will be understood that the present invention comprises a variable amplitude vibratory apparatus incorporating numerous advantages over the prior art. The most important advantage deriving from the use of the invention involves the fact that the eccentricity of a rotational type vibratory apparatus may be selectively controlled, providing an infinite choice of vibrating amplitude in accordance with the selectable rotational velocity of the apparatus. Prior art devices achieve only one working eccentricity. Their structure, i.e., their method of mounting springs and weights will not permit the fine control available with this invention. Another important advantage deriving from the use of the invention involves the fact the eccentricity of a rotational type vibratory apparatus may be held equal to zero or held at any constant value over a substantial range of rotational velocities, and yet may be selectively varied through a predetermined range of rotational velocities. Structurally, this invention also provides for a small ratio of inertia compared to vibrational force capacity. Other advantages deriving from the use of the invention will readily suggest themselves to those skilled in the art.

Although preferred embodiments of the invention and a limited number of modifications thereof have been illustrated in the accompanying drawings and described in the foregoing detailed description, it will be understood that the invention is not limited to the embodiments shown and described, but is capable of numerous rearrangements, modifications and substitutions of parts and types of elements without departing from the spirit and scope of the invention.

I claim:

1. A variable amplitude vibratory apparatus comprising:

shaft means supported for rotation about an axis;

first movable weight means mounted eccentrically on said shaft means for rotation therewith for movement between a position of relatively reduced eccentricity and a position of relatively increased eccentricity with respect to the axis of rotation;

first spring means biasing said first movable weight means toward the position of relatively reduced eccentricity;

second movable weight means mounted eccentrically on said shaft means for rotation therewith for movement between a position of relatively reduced eccentricity and a position of relatively increased eccentricity with respect to the axis of rotation, said second movable weight means being mounted with its center of mass on the opposite side of said shaft means from the center of mass of said first movable weight means;

second spring means biasing said second movable weight means toward the position of relatively reduced eccentricity;

said first spring means being preloaded to retain said first movable weight means in the position of relatively reduced eccentricity so that said shaft means remains balanced until the rotational shaft velocity increases above a first predetermined magnitude whereupon said first movable weight means begins outward movement against the action of said first spring means, the center of mass of said first spring means being positioned substantially on the axis of rotation while said first movable weight means is retained in the position of relatively reduced eccentricity, said first spring means moving toward a first spring means eccentric position with respect to the axis of rotation as said first movable weight means moves outward against the action of said first spring means, the regulated movement of said first movable weight means and said first spring means combining to progressively unbalance said shaft means until maximum unbalance is achieved at a higher, second predetermined magnitude of rotational shaft velocity;

said second spring means being preloaded to retain said second movable weight means in the position of relatively reduced eccentricity until the rotational shaft velocity increases beyond a higher, third predetermined magnitude whereupon said second movable weight means begins outward movement against the action of said second spring means toward the position of relatively increased eccentricity, the center of mass of said second spring means being positioned substantially on the axis of rotation while said second movable weight means is retained in the position of relatively reduced eccentricity, said second spring means moving toward a second spring means eccentric position with respect to the axis of rotation as said second movable weight means moves outward against the action of said second spring means, the movement of said second movable weight means and said second spring means combining to substantially reduce the unbalance of the shaft means caused by the positioning of said first weight means and first spring means in the position of maximum eccentricity until said shaft is balance at a higher, fourth predetermined magnitude of rotational shaft velocity, said second spring means being selected to define a predetermined range of rotational velocity between the third and fourth predetermined magnitude of rotational shaft velocity so that the amplitude of said apparatus may be selectively varied within the predetermined range;

first rod means mounted on said shaft means and having a first spring retainer, said first rod means extending substantially perpendicularly to the axis of rotation of said shaft means and slidably supporting said first movable weight means, said first spring means comprising a helical compression spring mounted concentrically about said first rod means and preloaded by said first spring retainer;

second rod means mounted on said shaft means and having a second spring retainer, said second rod means extending substantially perpendicularly to the axis of rotation of said shaft means and slidably supporting said second movable weight means, said second spring means comprising a helical compression spring mounted concentrically about said second rod means and preloaded by said second spring retainer;

first stop means for limiting outward movement of said first movable weight means and first spring means;

second stop means for limiting outward movement of said second movable weight means and second spring means; and said shaft means comprising enclosing structure extending between two end plates containing said first and second movable weight means and said first and second spring means therein and having first and second apertures for passage of the respective movable weight means, said first and second movable weight means comprising elongate hollow members, said first and second spring means being contained within the fist and second movable weight means, said first and second rod means extending from the enclosing structure into the first and second movable weight means, said first and second spring means being compressed between the interior of the first and second movable weight means and the first and second spring retainers, respectively.

2. A variable amplitude vibratory apparatus comprising:

shaft means;

means supporting said shaft means for rotation about an axis;

first movable weight means mounted eccentrically on said shaft means for rotation therewith for movement between a position of relatively reduced eccentricity and a position of relatively increased eccentricity with respect to the axis of rotation;

first spring means biasing said first movable weight means toward the position of relatively reduced eccentricity, the center of mass of said first spring means being positioned substantially on the axis of rotation while said first movable weight means is in the position of relatively reduced eccentricity;

second movable weight means mounted eccentrically on said shaft means for rotation therewith for movement between a position of relatively reduced eccentricity and a position of relatively increased eccentricity with respect to the axis of rotation;

second spring means biasing said second movable weight means toward the position of relatively reduced eccentricity, the center of mass of said second spring means being positioned substantially on the axis of rotation while said second movable weight means is in the position of relatively reduced eccentricity;

said first spring means being preloaded to retain said first movable weight means in the position of relatively reduced eccentricity so that the shaft means remains balanced until the rotational shaft velocity increases above a first predetermined magnitude whereupon said first movable weight means begins outward movement against the action of said first spring means toward the position of relatively increased eccentricity and said first spring means begins movement toward a position of eccentricity with respect to the axis of rotation to progressively unbalance said shaft means as rotational shaft velocity further increases until said shaft means is substantially unbalanced at a higher, second predetermined magnitude;

said second spring means being preloaded to retain said second movable weight means in the position of relatively reduced eccentricity until the rotational shaft velocity increases beyond a higher, third predetermined magnitude whereupon said second movable weight means begins outward movement against the action of said second spring means toward the position of relatively increased eccentricity and said second spring means begins movement toward a position of eccentricity with respect to the axis of rotation to substantially reduce the unbalance of the shaft means at a higher, fourth predetermined magnitude of rotational shaft velocity caused by the positioning of the first weight means and first spring means in the position of substantially increased eccentricity, said second spring means being selected to define a predetermined range of rotational velocity between the third and fourth predetermined magnitude of rotational shaft velocity so that the amplitude of said apparatus may be selectively varied within the predetermined range; and said first and second spring means comprising spring means secured between said shaft means and said first and second movable weight means, respectively, thereby performing the combined function of supporting said first and second movable weight means and biasing said first and second movable weight means toward the positions of relatively reduced eccentricity, said first and second spring means thereby forming first and second combined support/spring means; and said shaft means comprising enclosing structure extending between two spaced end plates, said enclosing structure containing said first and second combined support/spring means therein and having first and second apertures therein for passage of the respective movable weight means, said first and second combined support/spring means being positioned concentrically about a substantial portion of the respective movable weight means, a first end of said first and second combined support/spring means being secured to said shaft means about the periphery of the respective apertures and a second end being secured to the respective movable weight means and abutting said enclosing structure to preload said first and second spring means.

3. The variable amplitude vibratory apparatus of claim 2 further including first and second stop means mounted on said shaft means for limiting outward movement of the respective movable weight means.

4. The variable amplitude vibratory apparatus of claim 2 wherein said first and second combined support/spring means include elastomeric members.

5. The variable amplitude vibratory apparatus of claim 2 wherein said first and second combined support/spring means comprise helical compression spring members.

6. A balanced variable amplitude vibratory apparatus comprising:

shaft means supported for rotation about an axis;

first movable weight means mounted eccentrically on said shaft means for rotation therewith;

first combined support/spring means for supporting said first movable weight means or movement between a position of relatively reduced eccentricity and a position of relatively increased eccentricity with respect to the axis of rotation and for baising said first movable weight means toward the position of relatively reduced eccentricity; second movable weight means mounted eccentrically on said shaft means for rotation therewith, the center of mass of said second movable weight means bein mounted on the opposite side of said shaft means relative to the center of mass of said first movable weight means;

second combined support/spring means for supporting said second movable weight means for movement between a position of relatively reduced eccentricity and a position of relatively increased eccentricity with respect to the axis of rotation and for biasing said second movable weight means toward the position of relatively reduced eccentricity;

said first combined support/spring means being preloaded to retain said first movable weight means in the position of relatively reduced eccentricity so that said shaft means remains balanced until the rotational shaft velocity increases above a first predetermined magnitude whereupon said first movable weight means begins outward movement against the action of and while supported by said first combined support/spring means, the center of mass of said first combined support/spring means being positioned substantially on the axis of rotation while said first movable weight means is in the position of relatively reduced eccentricity, said first combined support/spring means moving to a position of eccentricity with respect to the axis of rotation as said first movable weight means moves outwardly against the action of said first combined support/spring means, the movement of said first combined support/spring means and said first movable weight means combining to progressively unbalance said shaft means as rotational shaft velocity further increases until said shaft means is substantially unbalanced at a higher, second predetermined magnitude; and said second combined support/spring means being preloaded to retain said second movable weight means in the position of relatively reduced eccentricity until the rotational shaft velocity increases beyond a higher, third predetermined magnitude whereupon said second movable weight means begins outward movement against the action of and while supported by said second combined support/spring means toward the position of increased eccentricity, the center of mass of said second combined support/spring means being positioned substantially on the axis of rotation while said second movable weight means is retained in the position of relatively reduced eccentricity, said second combined support/spring means moving to a position of eccentricity with respect to the axis of rotation as said second movable weight means moves against the action of said second combined support/spring means, the movement of said second combined support/spring means and said second movable weight means combining to substantially reduce the unbalance of the shaft means at a higher, fourth predetermined magnitude of rotational shaft velocity caused by the positioning of said first movable weight means in the position of substantially increased eccentricity and the positioning of the first combined support/spring means in the position of eccentricity, said second combined support/spring means being selected to define a predetermined range of rotational velocity between the third and fourth predetermined magnitude of rotational shaft velocities so that the amplitude of said apparatus may be selectively varied within the predetermined range;

the shaft means comprising enclosing structure extending between two spaced end plates, said enclosing structure containing said first and second combined support/spring means therein and having first and second apertures therein for passage of the respective movable weight means, said first and second combined support/spring means being positioned concentrically about a substantial portion of the respective movable weight means and secured at a first end to said shaft means about the periphery of the respective apertures and at a second end to the respective movable weight means and abutting said enclosing structure to preload the respective combined support/spring means.

7. The balanced variable amplitude vibratory apparatus of claim 6 further including first and second stop means mounted on said shaft means for limiting outward movement of the respective movable weight means.

8. The balanced variable amplitude vibratory apparatus of claim 6 wherein the first and second combined support/spring means include elastomeric members.

9. The balanced variable amplitude vibratory apparatus of claim 6 wherein the first and second combined support/spring means comprise helical compression spring members.

10. A balanced variable amplitude vibratory apparatus comprising:

shaft means supported for rotation about an axis;

first movable weight means mounted eccentrically on said shaft means for rotation therewith;

first combined support/spring means for supporting said first movable weight means for movement between a position of relatively reduced eccentricity and a position of relatively increased eccentricity with respect to the axis of rotation, and for biasing said first movable weight means toward the position of relatively reduced eccentricity;

second movable weight means mounted eccentrically on said shaft means for rotation therewith, the center of mass of the second movable weight means being mounted on the opposite side of said shaft means relative to the center of mass of said first movable weight means;

second combined support/spring means for supporting said second movable weight means for movement between a position of relatively reduced eccentricity and a position of relatively increased eccentricity with respect to the axis of rotation, and for biasing said second movable weight means toward the position of relatively reduced eccentricity;

said first combined support/spring means being preloaded to retain said first movable weight means in the position of relatively reduced eccentricity so that said shaft means remains balanced until the rotational shaft velocity increases above a first predetermined magnitude whereupon said first movable weight means begins outward movement against the action of and while supported by said first combined support/spring means, the center of mass of said first combined support/spring means being positioned substantially on the axis of rotation while said first movable weight means is in the position of relatively reduced eccentricity, said first combined support/spring means moving to a position of eccentricity with respect to the axis of rotation as said first movable weight means moves outwardly against the action of said first combined support/spring means, the movement of said first combined support/spring means and said first movable weight means combining to progressively unbalance said shaft means until maximum unbalance is achieved at a higher, second rotational shaft velocity;

said second combined support/spring means retaining said second movable weight means in the position of relatively reduced eccentricity until the rotational shaft velocity increases beyond a higher, third predetermined magnitude whereupon said second movable weight means begins outward movement against the action of and while supported by said second combined support/spring means toward the position of increased eccentricity, the center of mass of said second combined support/spring means being positioned substantially on the axis of rotation while said second movable weight means is retained in the position of relatively reduced eccentricity, said second combined support/spring means moving to a position of eccentricity with respect to the axis of rotation as said second movable weight means moves outwardly against the action of said second combined support/spring means, the movement of said second combined support/spring means and said second movable weight means combining to substantially reduce the unbalance of said shaft means caused by the positioning of said first movable weight means in the position of substantially increased eccentricity and the positioning of said first combined support/spring means in the position of eccentricity until a higher, fourth predetermined magnitude is achieved whereupon the shaft means is again balanced, said second combined support/-spring means being selected to define a predetermined range of rotational velocity between the third and fourth predetermined magnitude of rotational shaft velocity so that the amplitude of said apparatus may be selectively varied within the predetermined range;

first and second stop means mounted on said shaft means for limiting outward movement of the respective movable weight means;

said shaft means comprising enclosing structure extending between two spaced end plates, said enclosing structure containing said first and second combined support/spring means therein and having first and second apertures therein for passage of the respective movable weight means as said movable weight means move outwardly; and said first and second combined support/spring means secured between the periphery of said first and second apertures in said enclosing structure and said first and second movable weight means, respectively, said first and second combined support/spring means being positioned concentrically about a substantial portion of said first and second weight means and abutting against said enclosing structure to preload the combined support/spring means.

11. The balanced variable amplitude vibratory apparatus of claim 10 wherein said first and second combined support/spring means include elastomeric members.

12. The balanced variable amplitude vibratory apparatus of claim 10 wherein said first and second combined support/spring means comprise helical compression spring members.

* * * * *

UNITED STATES PATENT AND TRADEMARK OFFICE

CERTIFICATE OF CORRECTION

PATENT NO. : 4,348,912

DATED : September 14, 1982

INVENTOR(S) : HUBERT E. THOMAS

It is certified that error appears in the above—identified patent and that said Letters Patent is hereby corrected as shown below:

Column 11, Line 12, after "base", delete --plate--;

Column 26, line 30, "nd" should be --and--;

Column 29, line 24, "fist" should be --first--;

column 31, line 12 "bein" should be --being--.

Signed and Sealed this

*Thirtieth* Day of *November 1982*

[SEAL]

*Attest:*

GERALD J. MOSSINGHOFF

*Attesting Officer* *Commissioner of Patents and Trademarks*